(12) United States Patent
Varin

(10) Patent No.: US 11,415,211 B2
(45) Date of Patent: Aug. 16, 2022

(54) UNCOUPLING PULLEY

(71) Applicant: HUTCHINSON, Paris (FR)

(72) Inventor: Hervé Varin, Toue les Tours (FR)

(73) Assignee: HUTCHINSON, Paris (FR)

( * ) Notice: Subject to any disclaimer, the term of this patent is extended or adjusted under 35 U.S.C. 154(b) by 728 days.

(21) Appl. No.: 16/348,758

(22) PCT Filed: Nov. 15, 2017

(86) PCT No.: PCT/EP2017/079357
§ 371 (c)(1),
(2) Date: May 9, 2019

(87) PCT Pub. No.: WO2018/091550
PCT Pub. Date: May 24, 2018

(65) Prior Publication Data
US 2019/0323592 A1    Oct. 24, 2019

(30) Foreign Application Priority Data
Nov. 15, 2016    (FR) ...................................... 1661047

(51) Int. Cl.
*F16H 55/36*    (2006.01)
*F16D 41/20*    (2006.01)
(Continued)

(52) U.S. Cl.
CPC ............. *F16H 55/36* (2013.01); *B60B 15/26* (2013.01); *F16D 41/206* (2013.01);
(Continued)

(58) Field of Classification Search
CPC ... F16H 55/36; F16H 2055/366; B60B 15/26; F16D 41/206; F16D 2300/22; F16F 15/1213
See application file for complete search history.

(56) References Cited

U.S. PATENT DOCUMENTS 6,488,135 B1    12/2002   Kinoshita
9,239,093 B2 *   1/2016   Varin ...................... F16H 55/36
(Continued)

FOREIGN PATENT DOCUMENTS

DE    10 2015 205 612 B3    12/2015
EP         2 383 490 A1    11/2011
(Continued)

OTHER PUBLICATIONS

International Search Report, issued in PCT/EP2017/079357, dated Feb. 21, 2018.

*Primary Examiner* — David R Morris
(74) *Attorney, Agent, or Firm* — Birch, Stewart, Kolasch & Birch, LLP

(57) ABSTRACT

An uncoupling pulley includes a wheel rim including a first area, intended for receiving a belt connecting the wheel rim to a first power-transmission element, and a second area extending from the first area; a hub rigidly connected to a second power-transmission element; a ring gear including a first portion located under the second area and a second portion presented in the shape of a resilient cylindrical skirt extending, from the first portion, along the longitudinal axis, the cylindrical skirt of the ring gear including a plurality of longitudinal slots and consequently a plurality of portions separated from each other by one of the slots, the ring gear being capable of rotating relative to the wheel rim; and a device for driving the ring gear; and a resiliently deformable element, one end of which is attached to the hub and another end of which is attached to the ring gear.

17 Claims, 21 Drawing Sheets

(51) Int. Cl.
 B60B 15/26 (2006.01)
 F16F 15/121 (2006.01)
(52) U.S. Cl.
 CPC ...... F16F 15/1213 (2013.01); *F16D 2300/22* (2013.01); *F16H 2055/366* (2013.01)

(56) References Cited

U.S. PATENT DOCUMENTS

| | | | |
|---|---|---|---|
| 10,066,727 B2 * | 9/2018 | Bourgeais | F16D 41/206 |
| 10,359,084 B2 * | 7/2019 | Hauck | F16H 7/0827 |
| 2005/0250607 A1 * | 11/2005 | Jansen | F16D 41/206 |
| | | | 474/69 |
| 2013/0062155 A1 * | 3/2013 | Varin | F16F 15/1213 |
| | | | 192/41 S |
| 2016/0327036 A1 | 11/2016 | Ishii et al. | |
| 2018/0003282 A1 * | 1/2018 | Bourgeais | F16D 3/12 |
| 2018/0038424 A1 * | 2/2018 | Hauck | F16D 41/066 |

FOREIGN PATENT DOCUMENTS

| | | |
|---|---|---|
| JP | 2001-317567 A | 11/2001 |
| JP | 3140677 U | 4/2008 |
| JP | 2015-113810 A | 6/2015 |
| WO | WO 98/50709 A1 | 11/1998 |
| WO | WO 2014/048285 A1 | 4/2014 |
| WO | WO 2018/149816 A1 | 9/2016 |

\* cited by examiner

UNCOUPLING PULLEY

The invention concerns the field of uncoupling pulleys.

For example, an uncoupling pulley is proposed in document EP2383490 (D1).

The pulley of document D1 comprises a wheel rim rigidly connected to a first power-transmission element (a belt connected to an engine for example), a bell rigidly connected to a second power-transmission element (a shaft of an alternator for example), in particular through a hub, one of the power-transmission elements being driving and the other being driven, and a torsion spring centered inside the bell.

The wheel rim includes a driving stop designed to cooperate with the torsion spring in a first relative rotation direction between the wheel rim and the bell.

The bell has a first bell stop to limit the angle of rotation ($\alpha_1$) between the wheel rim and the bell in the first relative rotation direction between the wheel rim and the bell. This bell also includes a second bell stop for limiting the angle of rotation ($\alpha_4$) between the wheel rim and the bell in a second relative rotation direction between the wheel rim and the bell, this second rotation direction being opposite to the first relative rotation direction between the wheel rim and the bell.

More precisely, the torsion spring includes a first end and a second end arranged so that, in the first relative rotation direction, the first end of the torsion spring cooperates with the bell and the second end of the torsion spring cooperates with the drive stop of the wheel rim to close the spring on the bell until the second end of the torsion spring is abutted against the first bell stop. The angular position of the bell stop then defines a maximum angular displacement ($\alpha_1$) from the first end of the spring in this first relative rotation direction between the wheel rim and the bell.

This situation is encountered, for example, when the wheel rim, driving, for example, because the belt is connected to an engine during the starting phase, drives the bell, driven, by closing the torsion spring and then the abutting.

This is shown in FIG. 1.

FIG. 1 shows the operating principle of a pulley as described in document D1. More precisely, it represents the evolution of the torque transmitted between the wheel rim and the bell as a function of the evolution of the angle between the wheel rim and the bell. The origin on the angle corresponds to a limit position between a stress on the torsion spring and a lack of stress on the torsion spring.

In the portion where the angle is negative, the torque increases as the torsion spring closes in the bell, thus allowing the torque to pass between the wheel rim and the bell and therefore between the two power-transmission elements. Once the maximum angular displacement ($\alpha_1$) has been reached, the abutting then ensures a very high torque passage.

During deceleration, and from the corresponding abutting position the maximum angular displacement ($\alpha_1$), the wheel rim and the bell then rotate in the second relative rotation direction, the torsion spring is released in the bell until it reaches its neutral position. From this neutral position, the torque between the wheel rim and the bell is zero (except for residual friction). Depending on its deceleration level, the wheel rim can then continue its course (freewheeling mode), relatively to the bell, until the drive stop of the wheel rim or possibly another stop of the wheel rim contacts with the second bell stop.

Another maximum angular displacement ($\alpha_4$) is then reached.

This is shown on the right-hand side of FIG. 1 where the constant torque area and the effect of the abutting at this other maximum angular displacement ($\alpha_4$) are observed.

The device proposed in document D1 works perfectly.

However, the acceleration of the wheel rim in relation to the bell can be important. The abutting at the maximum angular displacement ($\alpha_1$) then generates repeated shocks that can affect the life of the pulley. A similar situation can be encountered for the other maximum angular displacement ($\alpha_4$). This is particularly the case for certain engine vehicles for which, during the engine starting phase, the accelerations and decelerations linked to the first cycles of the engine combustion are very high.

These repeated shocks can also cause the pulley on the power-transmission element, for example on the alternator, to loosen.

One of the objectives of the invention is to propose an uncoupling pulley that does not have at least one of the above-mentioned disadvantages.

For this purpose, the invention proposes an uncoupling pulley provided with a longitudinal axis, said pulley including:
- a wheel rim comprising a first area, intended for receiving a belt connecting the wheel rim to a first power-transmission element, and a second area located in the axial extension, namely in the direction defined by the longitudinal axis of the pulley, of the first area;
- a hub rigidly connected to a second power-transmission element;
- one of the power-transmission elements being driving and the other being driven;
- a ring gear including a first portion located under the second area of the wheel rim and a second portion presented in the shape of at least one cylindrical skirt extending, from the first portion, along said longitudinal axis, said ring gear being capable of rotating relative to the wheel rim and the hub about said longitudinal axis;
- means for driving the ring gear relative to the wheel rim;
- a resiliently deformable element, for example a torsion spring centered on the hub, a first end of which is fixed to the hub and a second end of which is fixed to the ring gear;
- said at least one cylindrical skirt being moreover located opposite the resiliently deformable element, so that the resiliently deformable element can contact said at least one cylindrical skirt.

The pulley, according to the invention, may also have at least one of the following characteristics, taken alone or in combination:
- said at least one cylindrical skirt of the ring gear is resilient;
- said at least one cylindrical skirt of the ring gear includes a plurality of longitudinal slots and consequently a plurality of portions separated from each other by one of the slots;
- at least one slot of said plurality of slots has a width, measured on a circumference of said at least one cylindrical skirt, strictly lower than a width of at least one portion of the cylindrical skirt;
- at least one slot of said plurality of slots has a width, measured on the circumference of said at least one cylindrical skirt, greater than or equal to a width of at least one portion of the cylindrical skirt;
- the ring gear is made of a material selected from plastics such as polyamide, polyester, polyoxymethylene, polyether ether ketone, polyphenylene sulfide or alloys thereof or thermoplastic elastomers;

the second portion of the ring gear is in the form of two concentric cylindrical skirts, the resiliently deformable element being located between the two cylindrical skirts;

the means for ensuring, in a first relative direction rotation between the wheel rim and the hub, the drive of the ring gear by the wheel rim include at least one stop located on the inner periphery of the wheel rim, at the level of the second area and at least one stop located on the outer periphery of the ring gear, at the level of the first portion;

the inner periphery of the wheel rim includes at least a second stop and the outer periphery of the ring gear includes at least a second stop;

the means for ensuring, in a first relative rotation direction between the wheel rim and the hub, the drive of the ring gear by the wheel rim include an unidirectional clutch, for example a torsion spring, an end of which is fixed to the ring gear and the remaining portion of which is mounted both under the second area of the wheel rim and around the ring gear;

the means for ensuring, in a first relative rotation direction between the wheel rim and the hub, the drive of the ring gear by the wheel rim include an unidirectional freewheel mounted on one hand, by force with the second area of the wheel rim and on the other hand, around the first portion of the ring gear;

the pulley includes at least one bearing located between the wheel rim and the hub;

said at least one bearing includes a radially extending face in contact with the hub;

said at least one bearing is made of either a plastic material selected from polyether ether ketone, polyethylene terephthalate, polyamide loaded with molybdenum disulfide ($MoS_2$), polyamide loaded with polytetrafluoroethylene or polyoxymethylene or a metallic or metallic alloy inner layer, covered by a polytetrafluoroethylene loaded outer layer;

the pulley provides a cover fixedly mounted on the wheel rim and preferably in contact with the ring gear.

The invention will be better understood and other purposes, advantages and characteristics of the invention will appear more clearly in the following description, which is made with reference to the following annexed figures.

Figure 1:
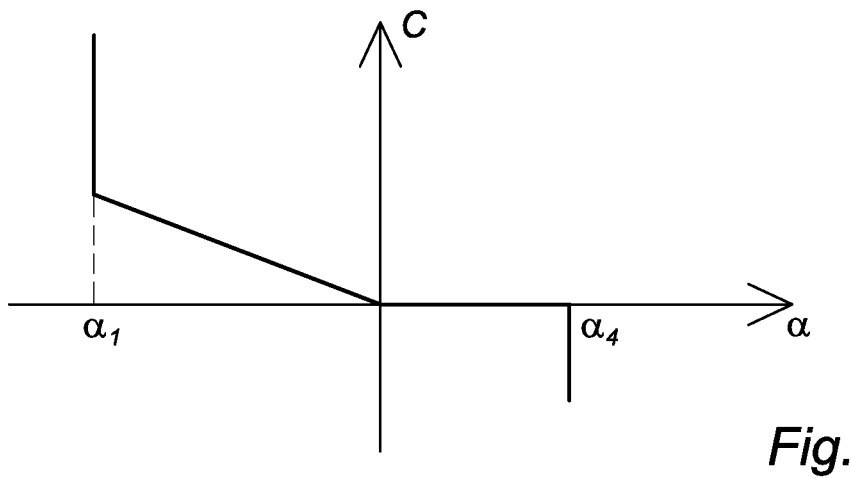
FIG. 1 represents the operating principle of a pulley according to the prior art.

A first embodiment of the invention is described with the support of FIGS. 2 to 10.

The uncoupling pulley 100 according to the invention has a wheel rim 1 rigidly connected to a first power-transmission element (not shown, for example a belt connected to a shaft of a vehicle engine, being driving). The wheel Rim 1 is equipped with a first area 11, outer, intended to receive a belt, in this case a poly V® type belt allowing the link to be made with the first power-transmission element and a second area 12 located in the axial extension, i.e. in the direction defined by the longitudinal axis AX of the pulley, of the first area 11.

The wheel rim 1 also has at least one stop 13, 14 located on the inner periphery of the wheel rim 1, at the second area 12. Such a stop 13, 14 is also called inner stop. Advantageously, and as shown in FIGS. 2 to 10, the wheel rim is equipped with at least two stops 13, 14 located on the inner periphery 110 of the wheel rim 1, always at the second area 12 of the wheel rim 1.

The pulley 100 also has a hub 2 rigidly connected to a second power-transmission element (e. g. an alternator shaft, being driven).

One of the power-transmission elements is being driving and the other is driven.

The pulley 100 also includes a ring gear 3, 30.

The ring gear 3, 30 includes a first portion 31 located under the second area 12 of the wheel rim and a second portion 32 in the form of at least one cylindrical skirt 35, 36 extending from the first portion 31 along said longitudinal axis AX. More precisely, in FIGS. 2 to 8, the second portion 32 is in the form of two concentric cylindrical skirts 35, 36. On the other hand, in FIGS. 9 and 10, which represent a variant of the pulley 100 illustrated in the previous figures, only one cylindrical skirt 35 is provided.

It should be noted that the first portion 31 of the ring gear is more rigid than the second portion 32 of this ring gear. This is related to the geometry of each of the two portions 31, 32, as shown in the attached figures, and in particular to the fact that the second portion 32 has a free end, located at the opposite from its anchorage area at the first portion 31.

The ring gear 3, 30 also includes at least one stop 33, 34 located on the outer periphery 330 of the ring gear 3, at the first portion 31. Such a stop 33, 34 is also called an outer stop. Advantageously, and as shown in FIGS. 2 to 10, the ring gear 3 is equipped with at least two stops 33, 34 located on the outer periphery 330 of the ring gear, always at the first portion 31 of the ring gear 3.

The pulley 100 is also equipped with a resiliently deformable element 4, in this case and as an example, a torsion spring 4, fixed to the hub 2 at a first end 41 and the ring gear 3 at a second end 42.

The torsion spring 4 is centered inside the hub 2. For this purpose, the hub 2, like any hub traditionally considered for uncoupling pulleys, includes an annular area ZA for centering the torsion spring 4 on it, this annular area ZA being delimited by two walls, namely the wall P1, radially inner, and the wall P2, radially outer, of the hub 2.

In addition, the or each cylindrical skirt 35, 36 of the ring gear 3 is inserted between the torsion spring 4 and the hub 2. In particular, when two cylindrical skirts 35, 36 are provided, the torsion spring 4 is advantageously located between the two cylindrical skirts 35, 36, the latter being themselves located between the two walls P1 and P2 of the hub 2.

Figure 9:
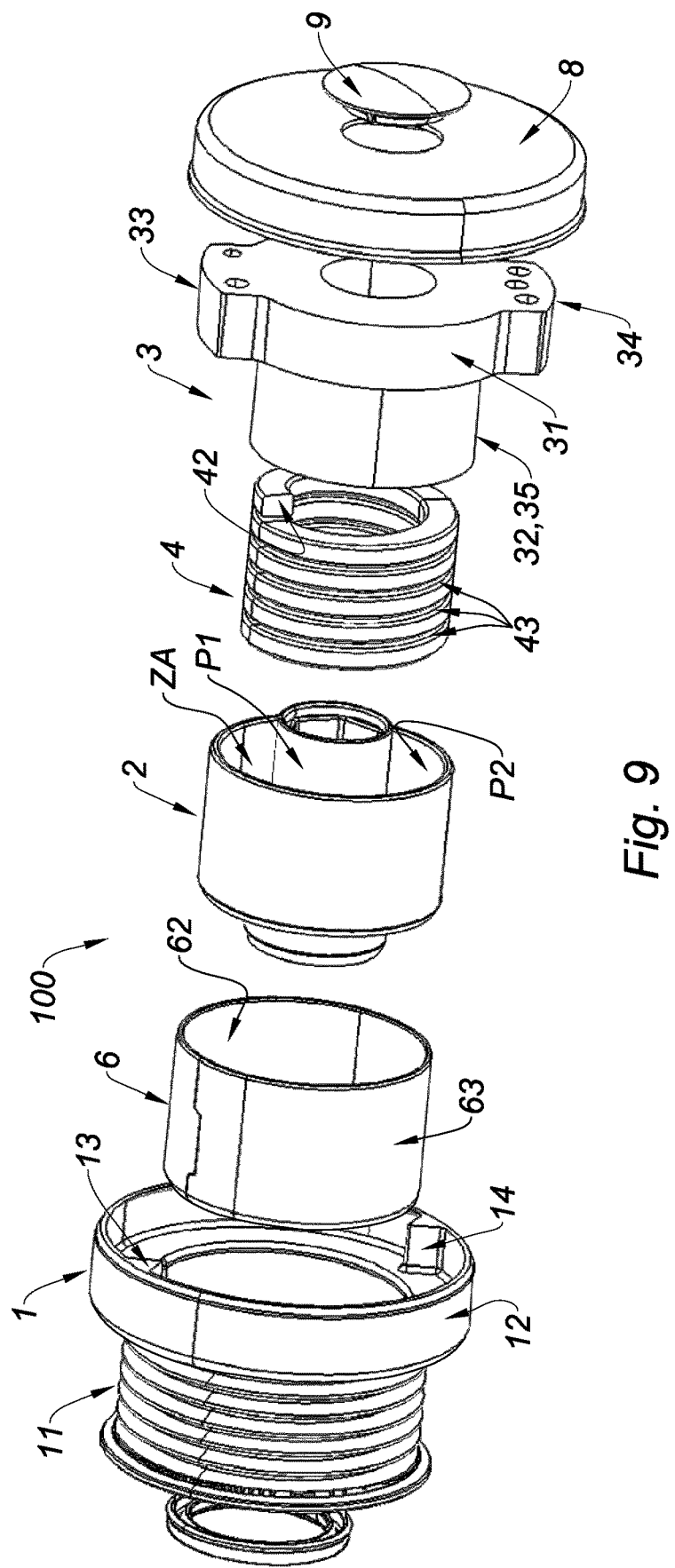
Figure 10:
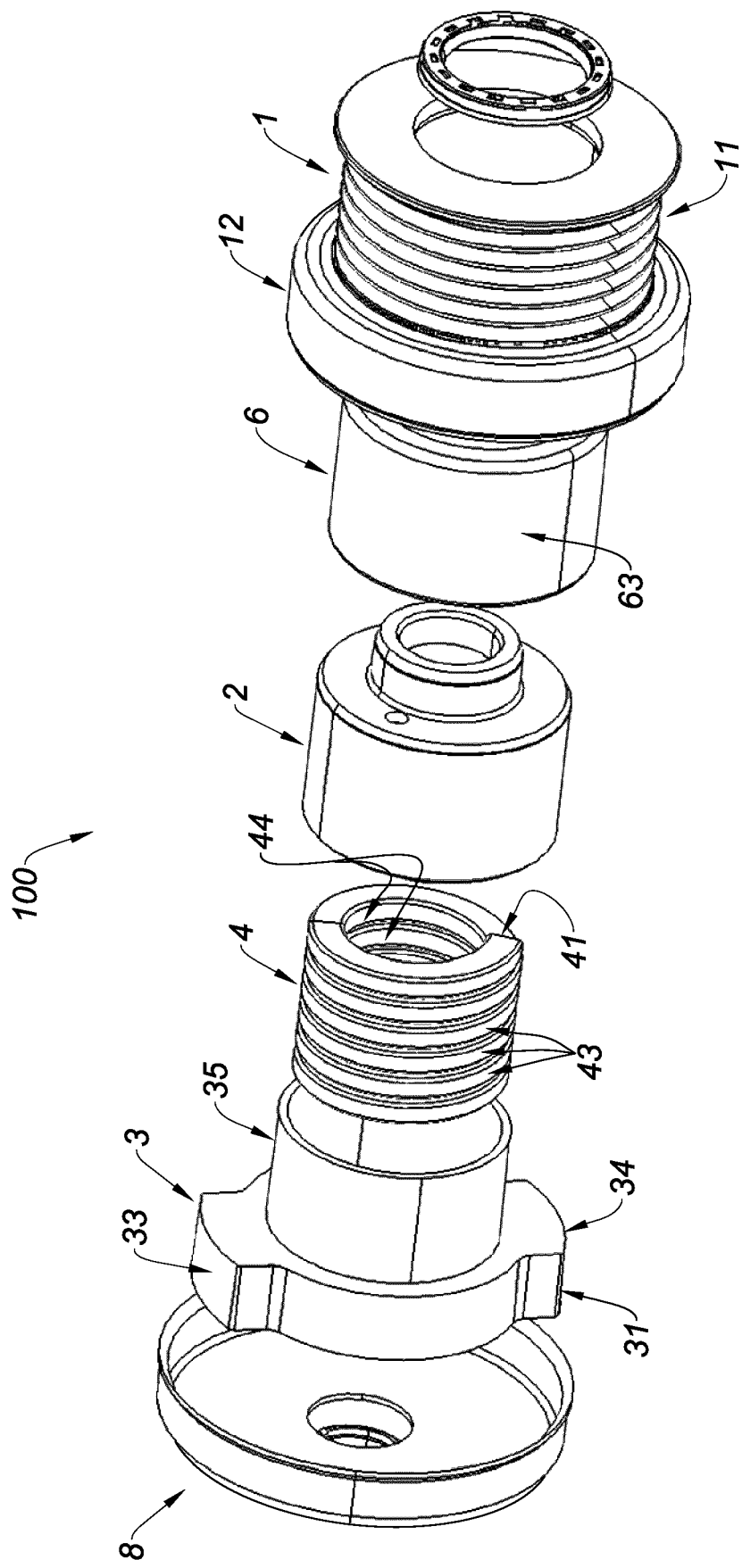
Figure 11:
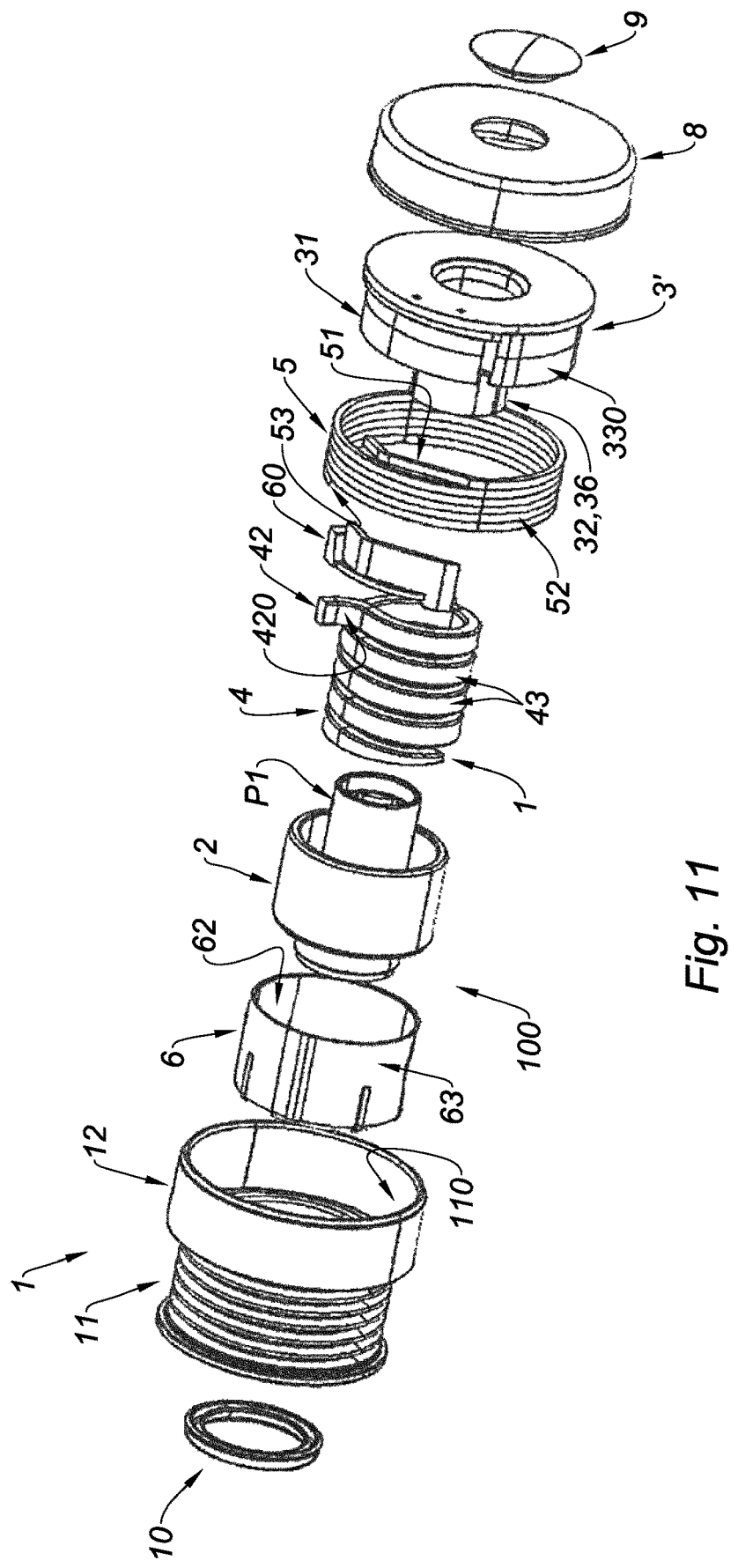
FIGS. 11 to 18 represent a second embodiment of an uncoupling pulley in accordance with the invention, in different variants.
Figure 12:
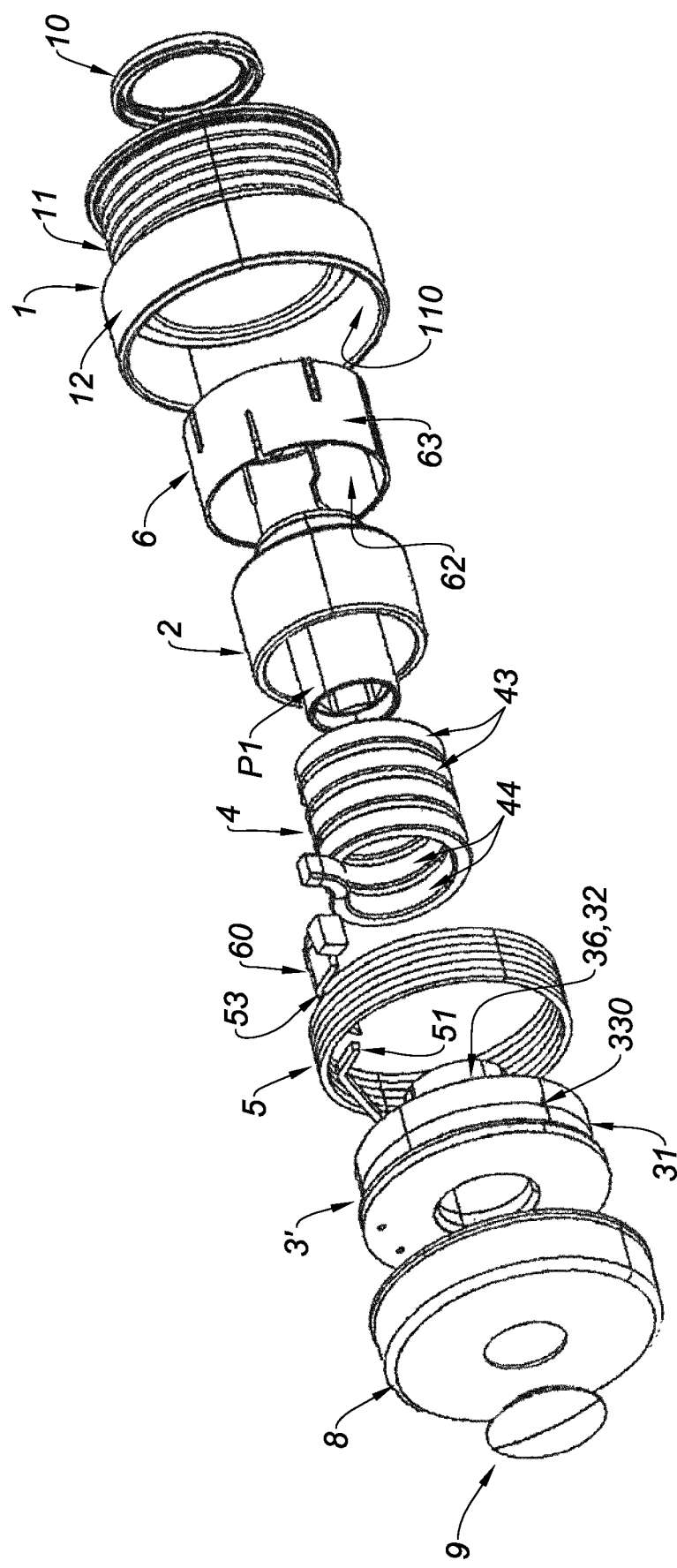

When two cylindrical skirts 35, 36 are provided, the fixing of the torsion spring 4 to the hub 2 and the ring gear 3, 30 can be carried out by means of an embedding or by means of retaining forms, provided in the hub 2 and in the ring gear 3, 30. In FIGS. 2 to 8, the end 42 of the torsion spring 4 is mounted by embedding in a housing 331 of the ring gear provided for this purpose, in order to accommodate an end 42, of curved shape, i.e. radially extending. In FIGS. 9 and 10, the end 42 of the torsion spring is not curved and therefore contacts a retaining shape (not visible in FIGS. 9 and 10) of the ring gear 3.

When two cylindrical skirts 35, 36 are provided, the torsion spring 4 is located between the two cylindrical skirts 35, 36.

The or each cylindrical skirt 35, 36 is located opposite the resiliently deformable element 4.

The ring gear 3 is centered on the hub 2. The ring gear 3, 30 is also able to rotate with respect to the hub 2 about the longitudinal axis AX of the pulley 100. The torsion spring 4 provides an resilient link between the hub 2 and the ring gear 3.

The ring gear 3 is also mounted under the wheel rim 1 and more particularly, the first portion 31 of the ring gear 3, 30 is located under the second area 12 of the wheel rim so that the ring gear 3 is able to rotate relative to the wheel rim 1 about said longitudinal axis AX of the pulley 100. This can be easily achieved by providing a clearance between the outer periphery 330 of the ring gear 3, 30 and the inner periphery 110 of the wheel rim 1.

However, means are provided to ensure the drive of the ring gear 3, 30 by the wheel rim 1, which is a mechanical link formed by the at least one inner stop 13, 14 of the wheel rim 1 and the at least one outer stop 33, 34 of the ring gear 3, 30. The drive of ring gear 3, 30 by wheel rim 1 can indeed be ensured by means of these stops. During operation, this drive is not always used, depending on the stresses placed on the driving element. This will be explained in more detail later, in particular with the support of FIGS. 7 and 8.

The pulley 100 also includes at least one bearing 6 located between the wheel rim 1 and the hub 2.

The bearing 6 ensures the relative rotation of the wheel rim 1 with respect to the hub 2. For this purpose, the bearing 6 is advantageously made of a plastic material selected from polyether ether ketone (PEEK), polyethylene terephthalate (PET), polyamide (PA) loaded with molybdenum disulfide (MoS2), polyamide (PA) loaded with polytetrafluoroethylene (PTFE) or polyoxymethylene (POM). Alternatively, the bearing 6 is made with a metal or metal alloy layer, covered by a polytetrafluoroethylene (PTFE) loader layer. These materials allow a low coefficient of friction.

The bearing 6 includes a radially inner face 62 extending longitudinally (along the AX axis) and in contact with the hub 2 and a radially outer face 63 extending longitudinally and in contact with the wheel rim 1. Advantageously, the bearing 6 also includes a radially extending face 61, i.e. substantially perpendicular to faces 62 and 63, and in contact with the hub 2. This face 61 makes it easier to mount and hold the bearing 6 in place.

The pulley 100 includes a cover 8. The cover 8 is intended to cover the wheel rim 1, on the side opposite to belt reception area 11. Advantageously, the cover 8 is mounted in contact with the ring gear 3, 30 and more precisely with the lateral face 37 of the ring gear 3, 30 which faces the cover 8.

The cover 8 is associated with a sealing plug 9.

Finally, the pulley 100 includes a sealing joint 10 coming into a lateral opening OL of the wheel rim 1, on the side opposite the sealing plug 9, to ensure a tight seal.

With regard to the ring gear, several design variants can be considered.

Figure 4:
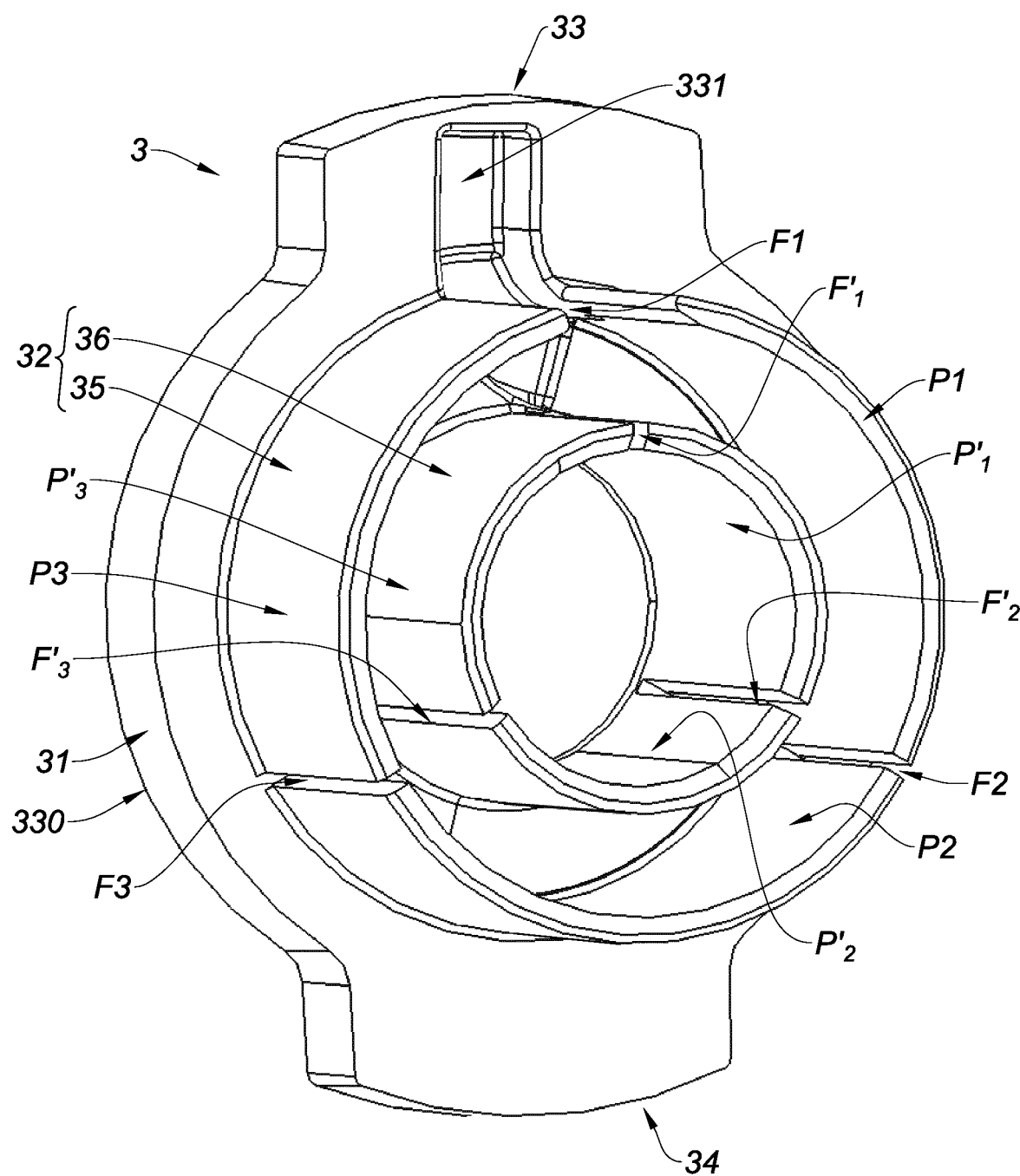

Thus, in FIG. 4, we have represented a ring gear 3 whose at least one cylindrical skirt 35, 36 of the ring gear 3 is resilient. In this case, the two concentric skirts 35, 36 are resilient. It is then understood that the first portion 31 of the ring gear is then much more rigid than the second portion 32 of this ring gear, because the second portion 32 (cylindrical skirt) is then made resiliently deformable.

To obtain this resiliency, several possibilities are feasible. In FIG. 4, said at least one cylindrical skirt 35, 36 of ring gear 3, in this case each cylindrical skirt 35, 36, includes a plurality of longitudinal slots F1, F2, F3, respectively F'1, F'2, F'3 and consequently a plurality of portions P1, P2, P3, P'1, P'2, P'3 separated from each other by one of the slots. The slot F1 is required to allow a passage for the end 42 of the torsion spring 4 to the housing 331. However, this slot F1 also allows, in combination with the other slots, to provide the desired resilience for each cylindrical skirt 35, 36. The ring gear 3 in FIG. 4 is also the one shown in FIGS. 2, 3 and 6 to 8.

However, the presence of at least one resilient cylindrical skirt 35, 36 is not necessary in the context of the invention.

Figure 5:
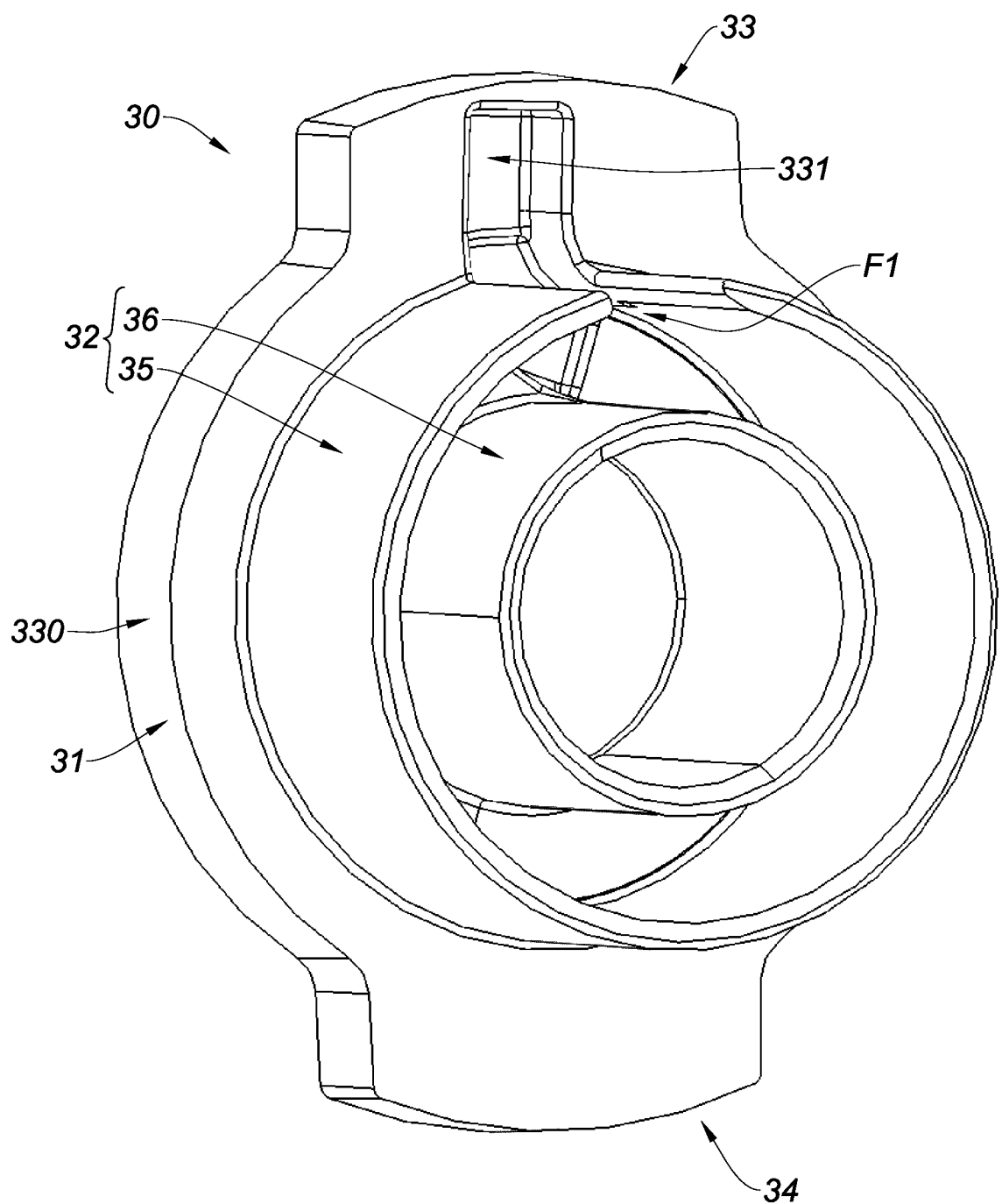
Figure 6:
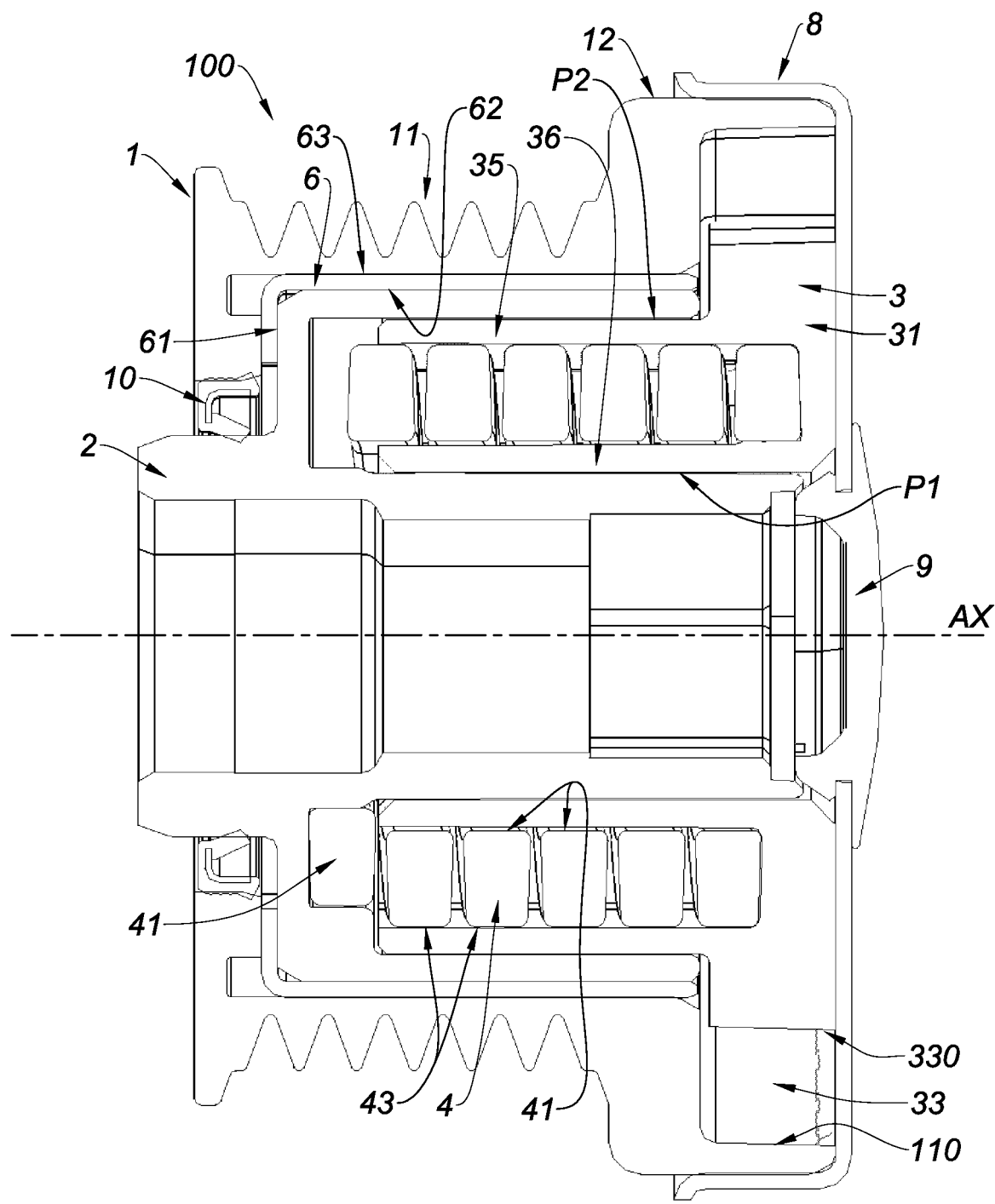

It is therefore possible to provide at least one cylindrical skirt 35, 36 of the ring gear 30 that does not have resiliency. This is shown in FIG. 5. In this FIG. 5, there are no slots, except for the slot F1, to allow the curved end 42 of the torsion spring 4 to pass through to the housing 331.

Of course, if the end 42 of the torsion spring is not curved, such a slot F1 is not necessary when a non-resilient ring gear 30 is considered. This is what can be observed in FIGS. 9 and 10. However, in the case of the variant of FIGS. 9 and 10, it is possible to provide a ring gear whose cylindrical skirt is consistent with the cylindrical skirt 35 of the ring gear 3 shown in FIG. 4 and in this case, each slot F1, F2, F3 is used only for providing resilient behavior to the skirt concerned. In another variant, an ring gear can even be provided identical to that of the ring gear 3 of FIG. 4.

Figure 21:
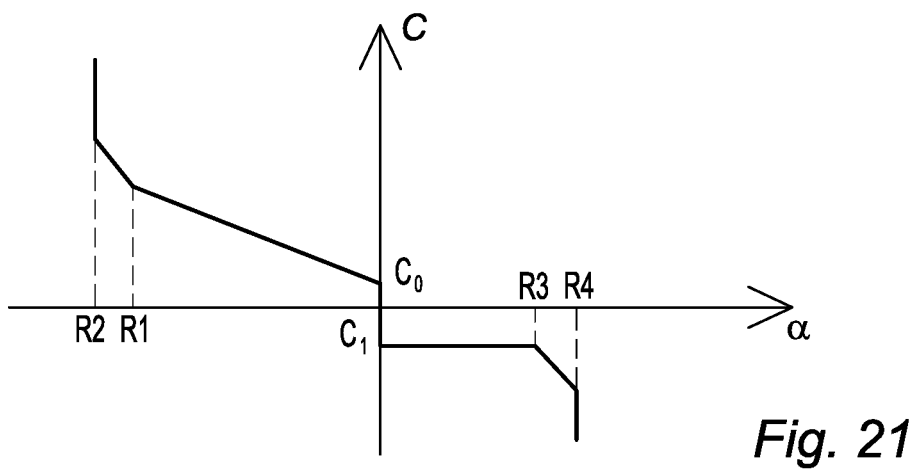
FIGS. 21 and 22 represent functional diagrams of the first embodiment of the invention, according to different variants.

We will now describe the operation of the pulley 100, in the case of an operation of the resiliently deformable element 4 in closure (FIGS. 2 to 8, presence of a curved end for the resiliently deformable element 4), on one hand for a ring gear 3, non-resilient supporting cylindrical skirt of FIG. 21 and on the other hand for a ring gear 3, non-resilient cylindrical skirt.

For the purpose of explanation, we describe the case where the wheel rim 1 is driving and the hub 2 is being driven.

FIG. 21 (case of a non-resilient cylindrical skirt) shows the evolution of the torque transmitted between the wheel rim 1 and the hub 2, as a function of the angle formed between the wheel rim 1 and the hub 2. The origin on the angle (zero angle) corresponds to a limit position between a stress on the resiliently deformable element 4 and an absence of stress on the same element 4 (at least over a certain range of values, as explained below).

Figure 7:
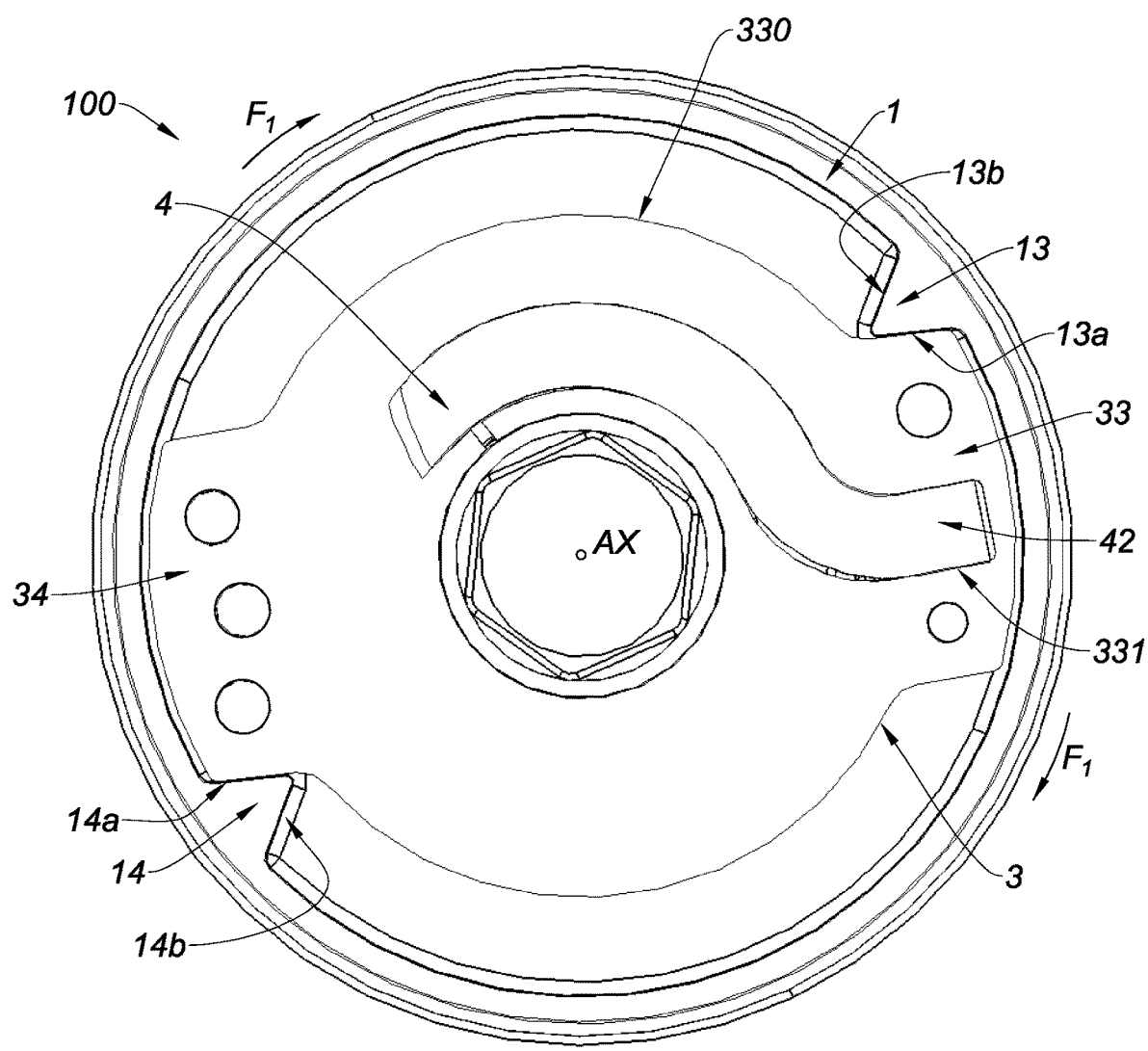

From the zero angle position, the wheel rim 1 is rotated clockwise (arbitrary convention in FIG. 7, coupling mode). This may correspond to an acceleration situation, for example when starting an engine.

An inner stop 13, 14 of the wheel rim 1 is then brought into contact, from its face 13, 14a, with an outer stop 33, 34 of the ring gear 3, 30. The wheel rim 1 then drives the ring gear 3, 30 in clockwise rotation. Since the resiliently deformable element 4, in this case a torsion spring, is fixed to both the ring gear 3, 30 and also to the hub 2, the ring gear 3 then drives the hub 2 via the resiliently deformable element 4, also in a clockwise direction. In FIG. 21, this results in a torque rise in the area of negative angle between the zero angle and the R1 angle. The torque then changes from zero to $C_0$ (at zero angle), which corresponds to the friction torque between the hub 2 and the bearing 6. Then it increases linearly as the resiliently deformable element 4 is stressed.

If the deformation of the resiliently deformable element 4 is sufficiently large, it will then contact with one of the cylindrical skirts 35, 36, in this case the cylindrical skirt with the smallest diameter, i.e. the cylindrical skirt 36 (since in this example, the resiliently deformable element 4, works in closing mode: FIGS. 2 to 8 with the presence of a curved end 42). This contact is defined by the angle R1 in FIG. 21.

Above the angle R1, the torque increases more quickly than below the angle R1, because the contact between the resiliently deformable element 4 and the cylindrical skirt 36 provides additional torque.

We are in this operation up to point R2. Between the R1 and R2 points, the contact area between the resiliently deformable element and the cylindrical skirt 36 only increases. This is the case, for example, when the resiliently deformable element 4 is a torsion spring, because in this case more and more coils of the torsion spring 4 contact the cylindrical skirt 36 as the angle increases (in absolute values).

At point R2, the resiliently deformable element 4 can no longer be deformed and is completely blocked by the cylindrical skirt 36. For example, in the case where the resiliently deformable element 4 is a torsion spring, this corresponds to a situation where all the inner surfaces 44 of the spring coils contact the cylindrical skirt 36. From point R2, the torque going from the wheel rim 1 to the hub 2 passes through the first portion 31 of the ring gear 3 and through the then rigid assembly formed by both the resiliently deformable element 4 and the cylindrical skirt 36. This point R2 corresponds to the configuration of the pulley 100 shown in FIG. 7.

Unlike the pulley of the prior art (D1 document), there is no clear abutting.

In addition, compared to document D2 (DE102015205612), the contacting of the resiliently deformable element 4 with the cylindrical skirt does not imply any stress on the means to ensure the drive of the ring gear in relation to the wheel rim. This is due to the fact that the first portion 31 of the ring gear is more rigid than its second portion 32.

The lifetime of the pulley 100 is thus improved.

If the pulley 100 is decelerated (e. g. engine stop or deceleration phase during engine start), then the curve in FIG. 21 is traversed in the opposite direction until the zero angle is reached. During this return to zero angle, the inner 13, 14 and outer 33, 34 stops remain in contact under the action of the resistant torque of the hub 2 and the resiliently deformable element 4 which naturally seeks to return to its equilibrium position.

If the deceleration is strong enough, then we will be in the positive angle area.

Figure 8:
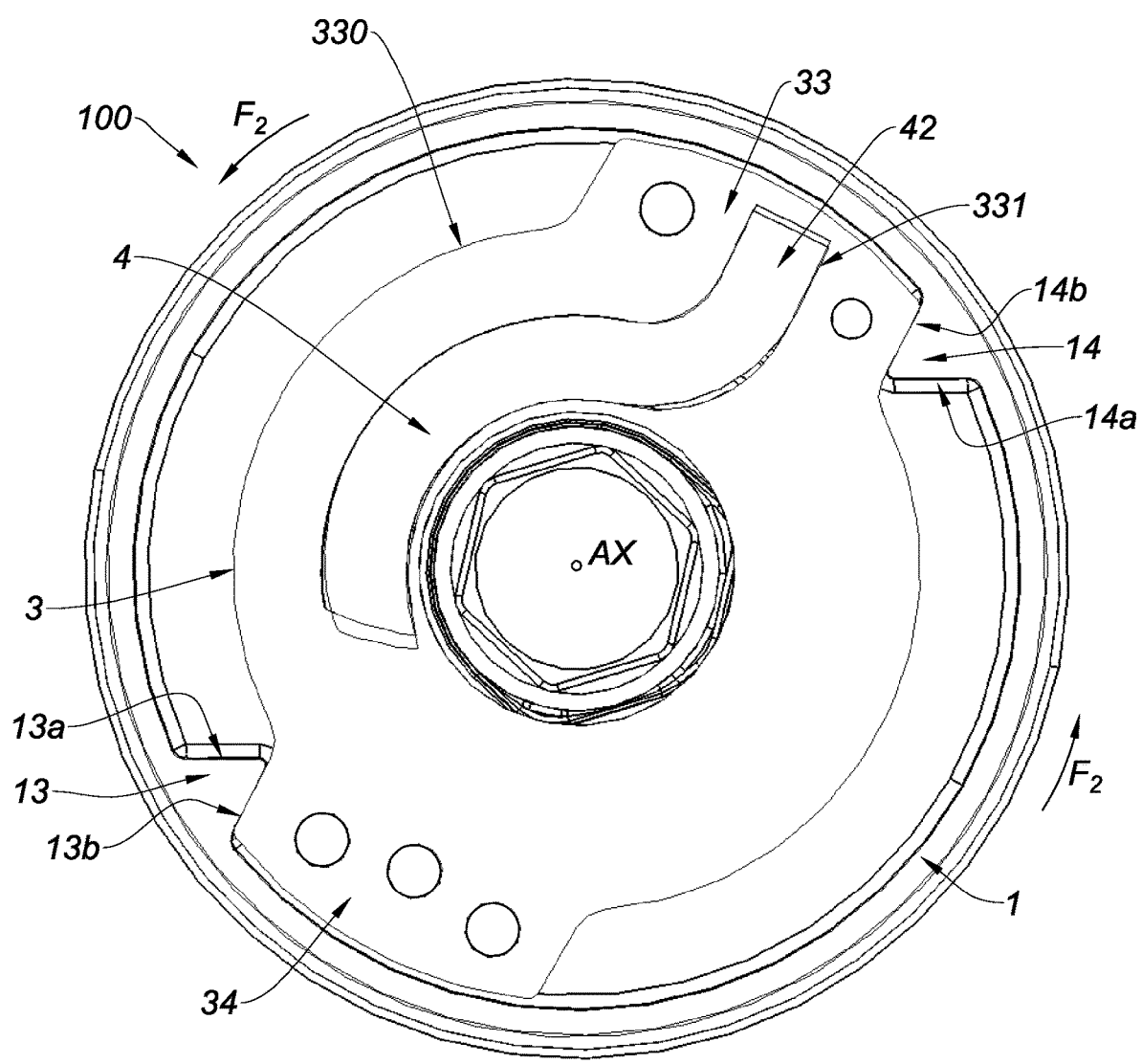

More precisely, from the zero angle, the inner stops 13, 14 and outer stops 33, 34 are no longer in contact and the wheel rim 1 performs a relative rotational movement compared to the ring gear 3 which is counter-clockwise (arrow F2 in FIG. 8).

Between the zero angle and the angle R3, the torque is then constant, due to the absence of stress on the resiliently deformable element 4. However, this torque is not zero and consists of the friction of the wheel rim 1 on the bearing 6 to which is added the friction between the cover 8 (fixed to the wheel rim 1) and the face 37 of the ring gear 3. When the zero angle is passed, the torque changes from $C_0$ to $C_1$ value (with $|C_1|>C_0$, because the cover/ring gear friction is added to the friction associated with the bearing). The contact force between the ring gear 3 and the cover 8 is generated by an axial preload of the resiliently deformable element 4. This preload can be adjusted according to the desired $C_1$ level. It should be noted that the friction between the cover 8 and the face 37 of the ring gear 3 then allows the hub 2 to decelerate more quickly than, if we press only, between the zero angle and the angle R30, on the bearing/hub friction alone. This is particularly interesting because the over speed of the hub 2 with respect to the wheel rim 1 generates noise phenomena that can thus be limited.

Of course, if the cover 8 was not contacting the ring gear 3, then this torque $C_1$ would be equal to $C_0$. There would be no contribution from the friction of the cover/ring gear.

From the angle R3, the inner stops 13, 14 and outer stops 33, 34 are contacting again, through the faces 13b, 14b of the inner stops of the wheel rim 1.

This contact will slow down the counter-clockwise movement of the wheel rim 1, helped by a placing under stress of the resiliently deformable element 4. This results in a decrease in torque between the angles R3 and R4 in FIG. 21. Indeed, under the effect of this stress, the resiliently deformable element 4 will deform, but in opening, until it contacts the cylindrical skirt of larger diameter, namely the cylindrical skirt 35. The contact area between the resiliently deformable element 4 increases between the angles R3 and R4, thus increasing more and more the torque (braking effect).

The angle R4 corresponds to the situation in which the resiliently deformable element 4 is blocked by the cylindrical skirt 35. This is particularly the case when the resiliently deformable element 4 is a torsion spring, the angle R4 then corresponding to a situation in which all the outer surfaces 43 of the spring coils are in contact with the cylindrical skirt 35. At the R4 angle, the resiliently deformable element 4 and the cylindrical skirt 35 form a rigid assembly through which the torque passes.

Figure 22:
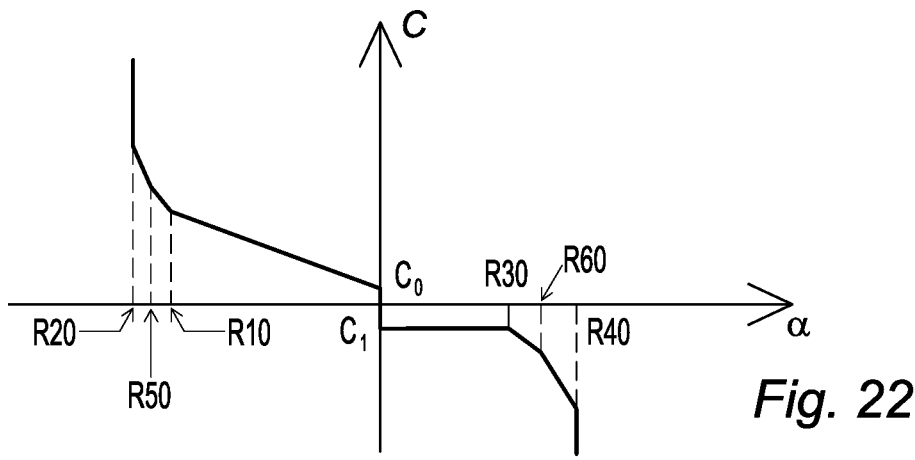
Figure 2:
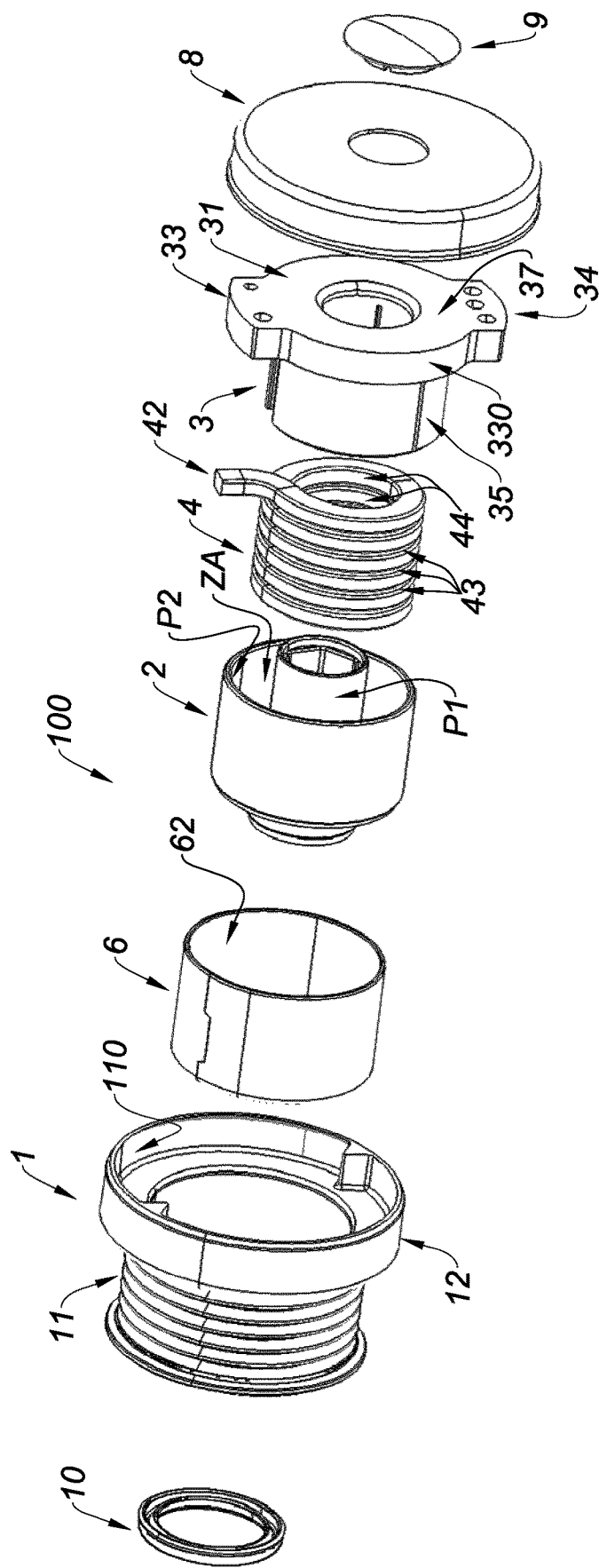
FIGS. 2 to 10 represent an embodiment of an uncoupling pulley in accordance with the invention, in different variants.
Figure 3:
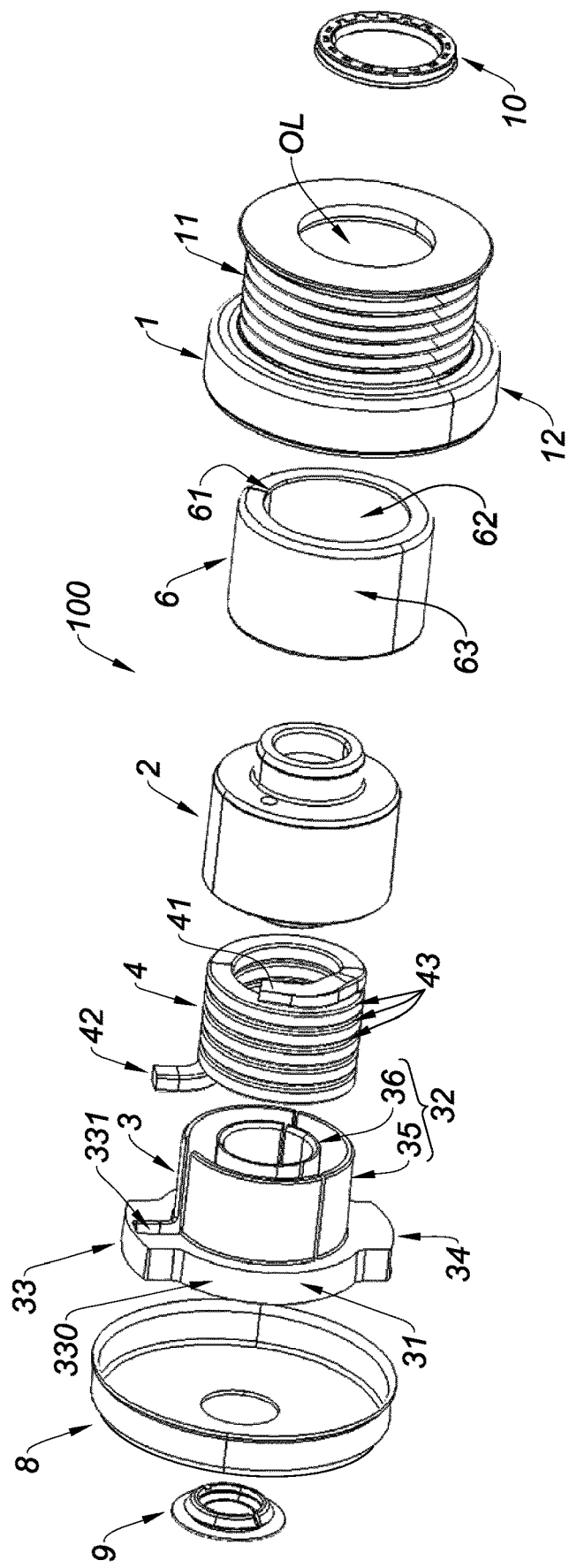

FIG. 22 (case of a resilient cylindrical skirt) shows the evolution of the torque transmitted between the wheel rim 1 and the hub 2, as a function of the angle formed between the wheel rim 1 and the hub 2. The origin on the angle (zero angle) corresponds to a limit position between a stress on the resiliently deformable element 4 and an absence of stress on the same element 4 (at least over a certain range of values, as explained below).

The operation described above can be transposed in part here.

In particular, if we compare FIG. 22 to FIG. 21:
the angle R10 corresponds to the angle R1,
the angle R30 corresponds to the angle R3,
the angle R20 corresponds to the angle R2, insofar as it is a position in which the resiliently deformable element can no longer be deformed, and
the angle R40 corresponds to the angle R4, insofar as it is a position in which the resiliently deformable element can no longer be deformed.

However, the fact that cylindrical skirts 35, 36 are resilient allows, when the resiliently deformable element 4 is contacting with one of these cylindrical skirts 35, 36, to deform it.

Thus, the angle R50 corresponds to a contacting of the resiliently deformable element 4 with the cylindrical skirt 36 and the area between the angle R50 and the angle R20 corresponds to the deformation area of the cylindrical skirt 36. The angle R20 then corresponds to a position in which the cylindrical skirt 36, due to its deformation printed by the action of the resiliently deformable element 4, is contacting the hub 2, and more particularly in this case, the wall P1 of the hub 2. Once the cylindrical skirt 36 is contacting the hub 2, no further deformation of the cylindrical skirt 36, or indeed of the resiliently deformable element, is then possible.

Thus also, the angle R60 corresponds to a contacting of the resiliently deformable element 4 with the cylindrical skirt 35 and the area between the angle R60 and the angle R40 corresponds to the deformation area of the cylindrical skirt 35. The angle R40 then corresponds to a position in which the cylindrical skirt 35, due to its deformation printed by the action of the resiliently deformable element, is contacting the hub 2, and more particularly the wall P2 of the hub 2. Once the cylindrical skirt 35 contacts the hub 2, no further deformation of the cylindrical skirt 35 or indeed of the resiliently deformable element 4 is then possible.

It should be remembered that the pulley 100 can however work in opening in coupling mode, according to the variant in FIGS. 9 and 10.

In this case, the operation of the pulley 100 is, in the area of negative angles, similar to that described above in support of FIGS. 21 and 22. However, the resiliently deformable element 4 working in opening will contact the cylindrical skirt of larger diameter, i.e. the cylindrical skirt 35.

In the positive corner area, a similar operation can also be expected to occur to that of FIGS. 21 and 22, if a smaller diameter cylindrical skirt, namely cylindrical skirt 36, is provided, with non-resilient behavior (FIG. 21) or resilient behavior (FIG. 22, presence of slots for example). And when this possibility is considered, it is then necessary to embed the ends of the resiliently deformable element 4 in the hub 2 and the ring gear 3.

If the cylindrical skirts 35, 36 are resilient, they will deform as explained above.

In the operation explained above (FIG. 21 or FIG. 22, for which the coupling mode is performed during closing or the equivalents for which the coupling mode is performed during opening), the two cylindrical skirts 35, 36 are used.

The presence of the two cylindrical skirts 35, 36 for the pulley 100 corresponding to the first embodiment is particularly advantageous because it allows, in comparison to the prior art of FIG. 1, to avoid the two clear stops of this prior art.

However, only one cylindrical skirt 35, 36 can be provided if one wishes to improve only partially the functioning compared to the prior art disclosed in document D1. For example, it is possible to work with a resiliently deformable element 4 working in closing in coupling mode, with the cylindrical skirt 36 to obtain a braking or damping effect only on the side of negative angles.

A second embodiment of the invention is described in support of FIGS. 11 to 18.

Compared to the first embodiment, the modification concerns the way in which the drive is carried out between the wheel rim 1 and the ring gear 3', 30', 300'. Thus, in this second embodiment, the pulley 100' is such that the wheel rim 1 does not have inner stops and the ring gear 3', 30', 300' does not have outer stops.

For this pulley 100', the drive between the wheel rim 1 and the ring gear 3', 30', 300' is carried out by means of a unidirectional clutch 5.

The unidirectional clutch 5 includes an end 51 fixed to the ring gear 3', 30', 300' for example by insertion or embedinment in a housing 332 made in the ring gear 3', 30', 300'. The ring gear 3', 30', 300' of the pulley 100' is therefore slightly modified (FIGS. 13 to 15), compared to the ring gear 3, 30 of the pulley 100, to be able to adapt to the presence of the unidirectional clutch 5. Nevertheless, the first portion 31 of the ring gear 3', 30', 300' is more rigid than the second portion 32 of this ring gear. The remaining portion 52 of the unidirectional clutch 5 is mounted both under the second area 12 of the wheel rim 1 and around the ring gear 3', 30', 300', i.e. between the inner periphery 110 of the second area 12 of the wheel rim 1 and the outer periphery 330 of the first portion 31 of the ring gear 3', 30', 300'. It should be noted that this portion 52 has the general shape of a cylinder.

Advantageously, the other end 53 of the unidirectional clutch 5 is left free and is therefore not attached to either the ring gear 3', 30', 300' or the wheel rim 1. In this case, the unidirectional clutch 5 is selected so that in its natural state, the diameter of this unidirectional clutch 5 is larger than the inner diameter of the wheel rim 1, which ensures a preload of the unidirectional clutch 5 when it is inserted between the wheel rim 1 and the ring gear 3', 30', 300'.

Figure 14:
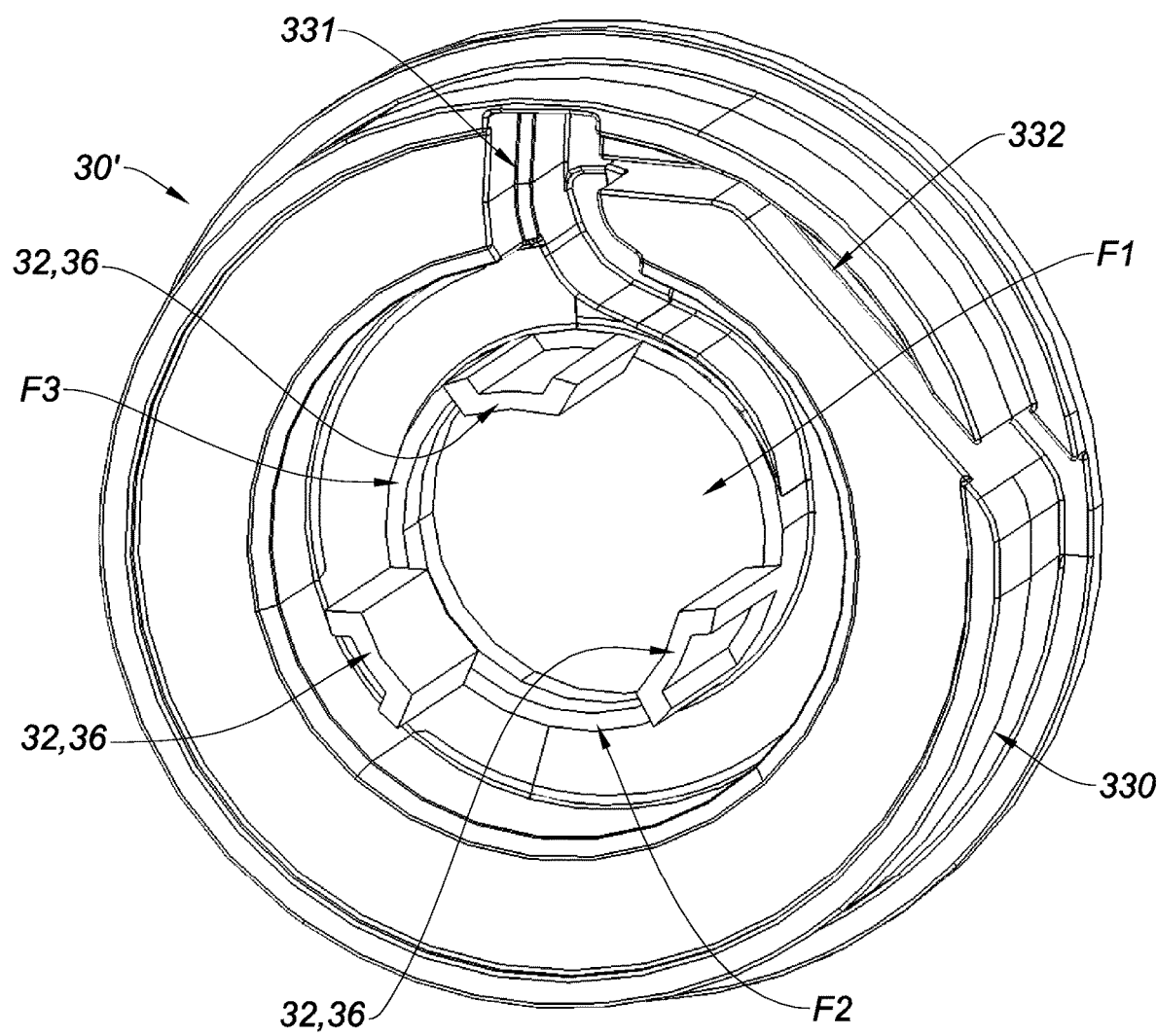
Figure 15:
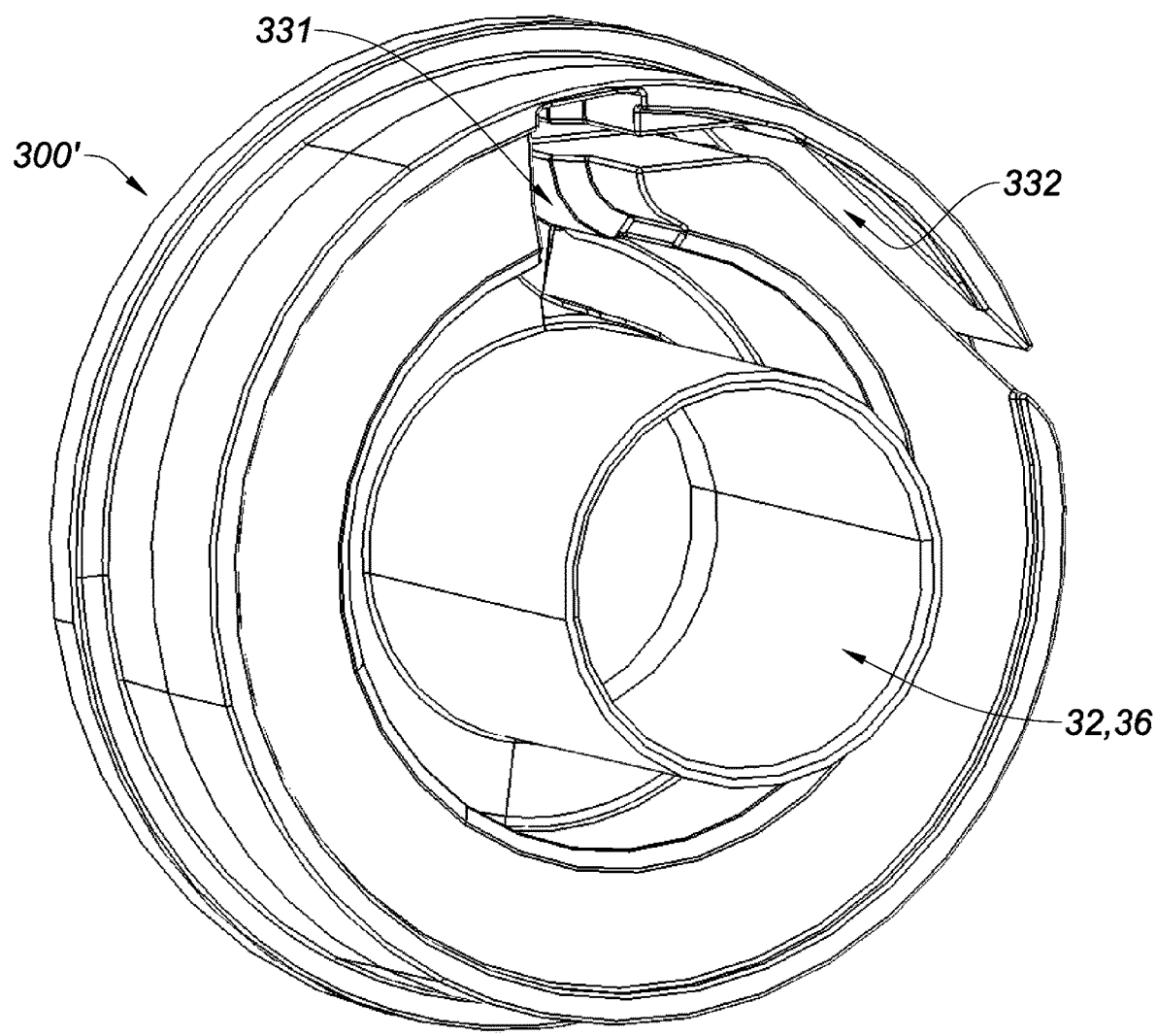
Figure 16:
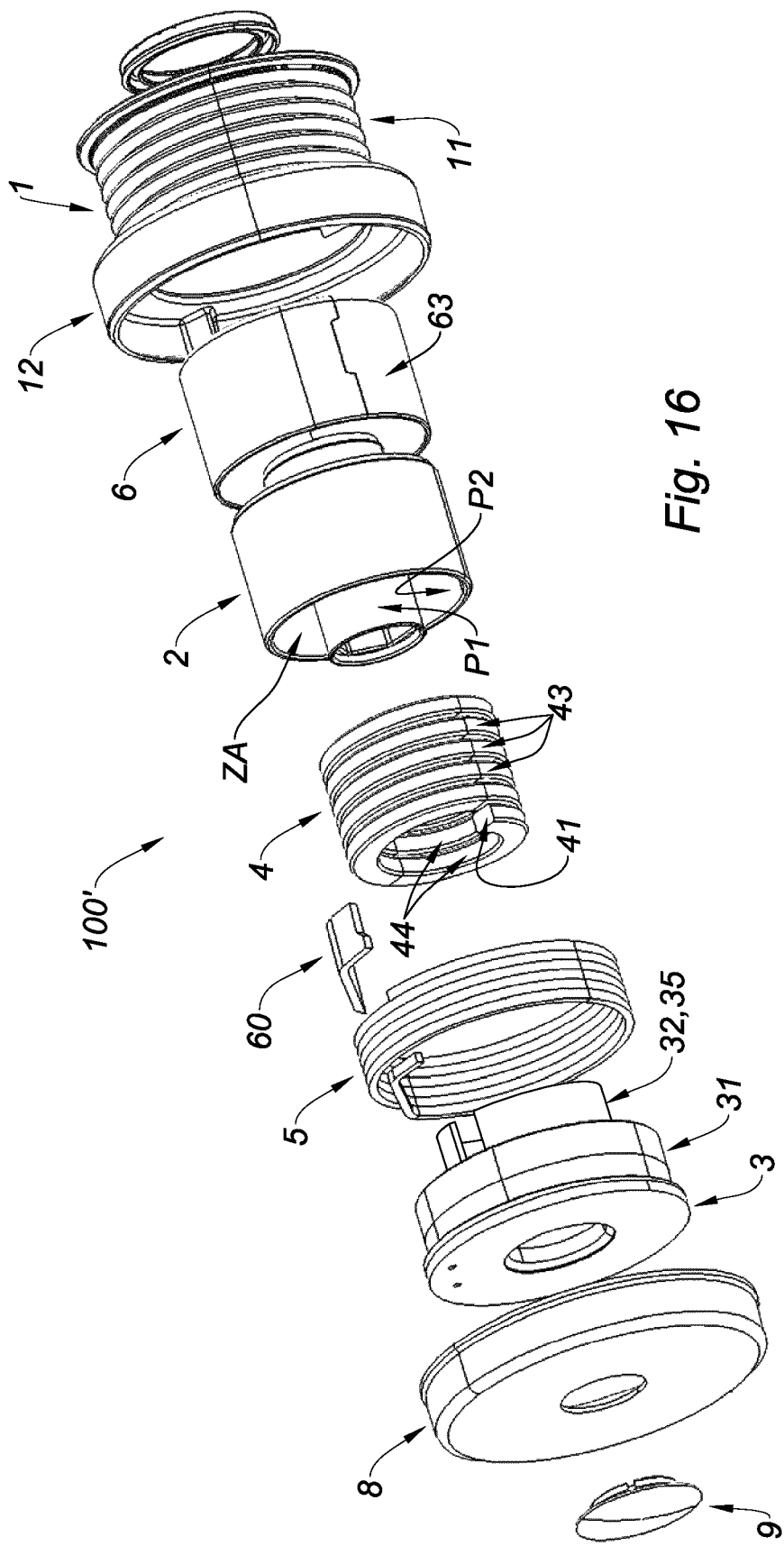

The above applies to FIGS. 11 to 15 and FIGS. 17 and 18 where the end 42 of the torsion spring 4 is curved (draw a parallel with FIGS. 2 to 8 of the first embodiment), but also to the variant of FIG. 16, for which the end 42 of the torsion spring is not curved (draw a parallel with the variant of FIGS. 9 and 10 of the first embodiment).

When the end 42 of the torsion spring 4 is curved (see FIGS. 11 to 15 for example), the end 51 of the unidirectional clutch 5 is advantageously presented, and as shown in the attached Figures, by an arm. This end or arm 51 advantageously contacts the end 42 of the torsion spring 4, to provide a better torque transmission. More precisely, the end 51 of the unidirectional clutch contacts a side face 420 of the curved end 42 of the torsion spring 4 (this can be illustrated in FIGS. 11 and 13, for example).

On the contrary, when this end 42 is not curved (FIG. 16), there is necessarily no contact with the end 51 of the unidirectional clutch 5.

It should be noted that advantageously, a corner 60 located in the axial extension can be provided, i.e. in the direction defined by the longitudinal axis AX of the pulley 100', of the end 51 of the unidirectional clutch 5. This corner 60 makes it easier to hold the arm 51 in place when transmitting torque. The corner 60 allows the arm 51 to be better held in the housing 332 provided in the ring gear 3', 30', 300" to receive this arm 51. In particular, the corner 60 prevents the arm 51 from buckling when the torque is applied.

Figure 17:
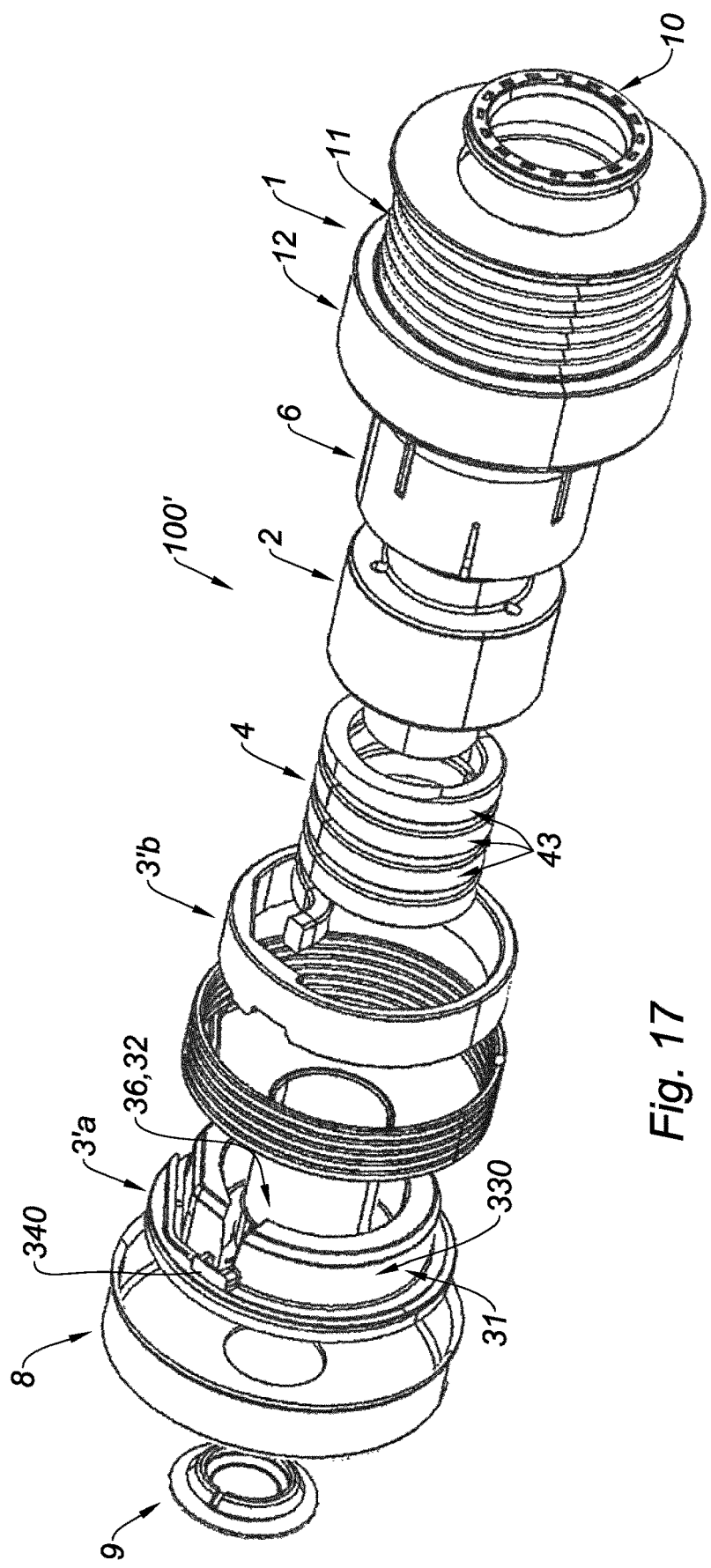
Figure 18:
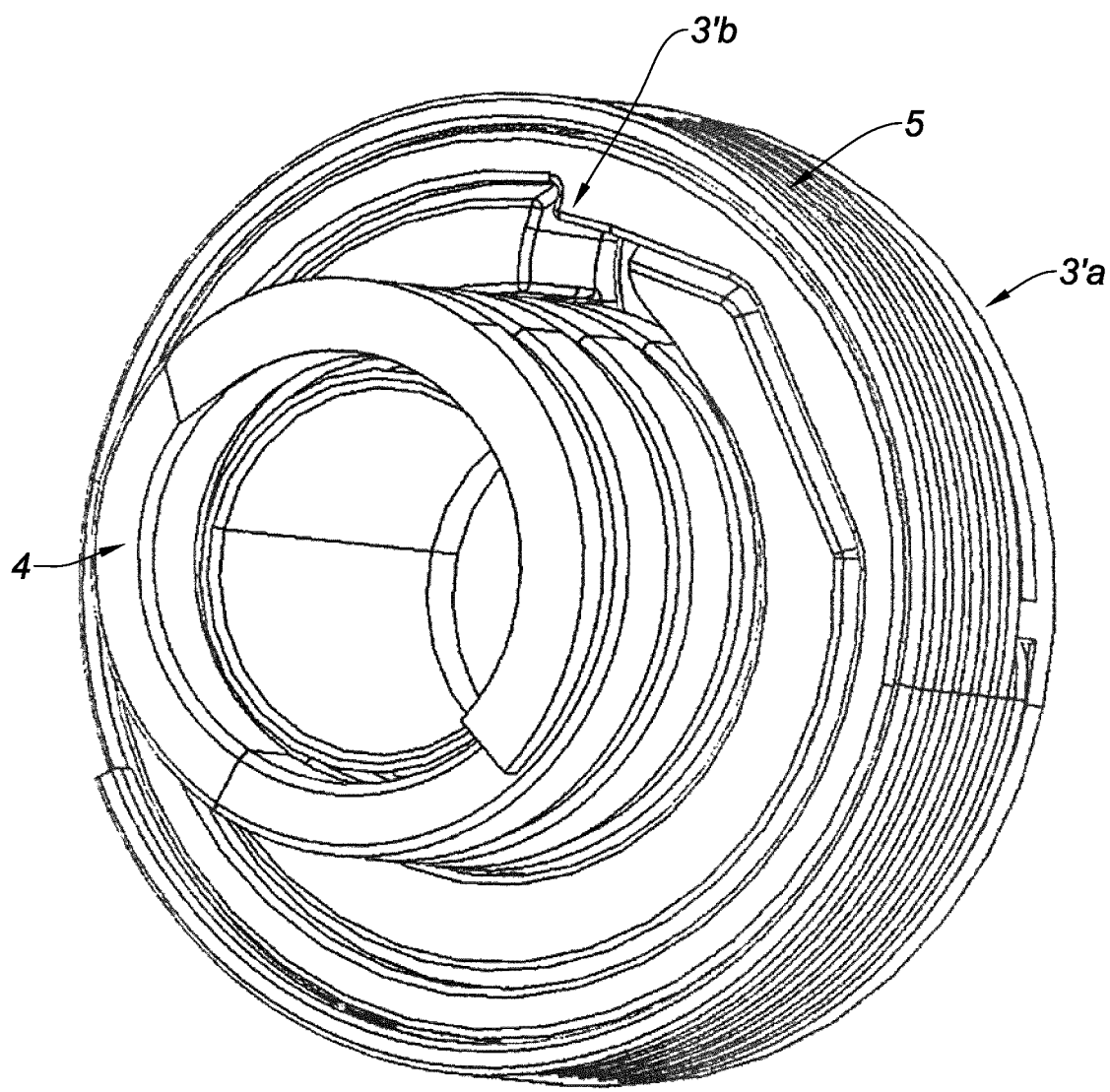

It should be noted that the function performed by the corner 60 can be obtained otherwise. Indeed, and as it is represented in FIGS. 17 and 18, we can consider implementing a counter-ring gear 3'*b* and a complementary shape 340 on the ring gear 3'*a* itself which comes to cooperate with the counter-ring gear 3'*b*. This design is easier, compared to the one involving a corner 60, for mounting the pulley.

It is understood that the unidirectional clutch 5 is connected in series with the torsion spring 4, via the ring gear 3', 30', 300' which keeps them in contact.

Similar to the first embodiment, several designs are possible for the ring gear 3', 30', 300'.

Figure 13:
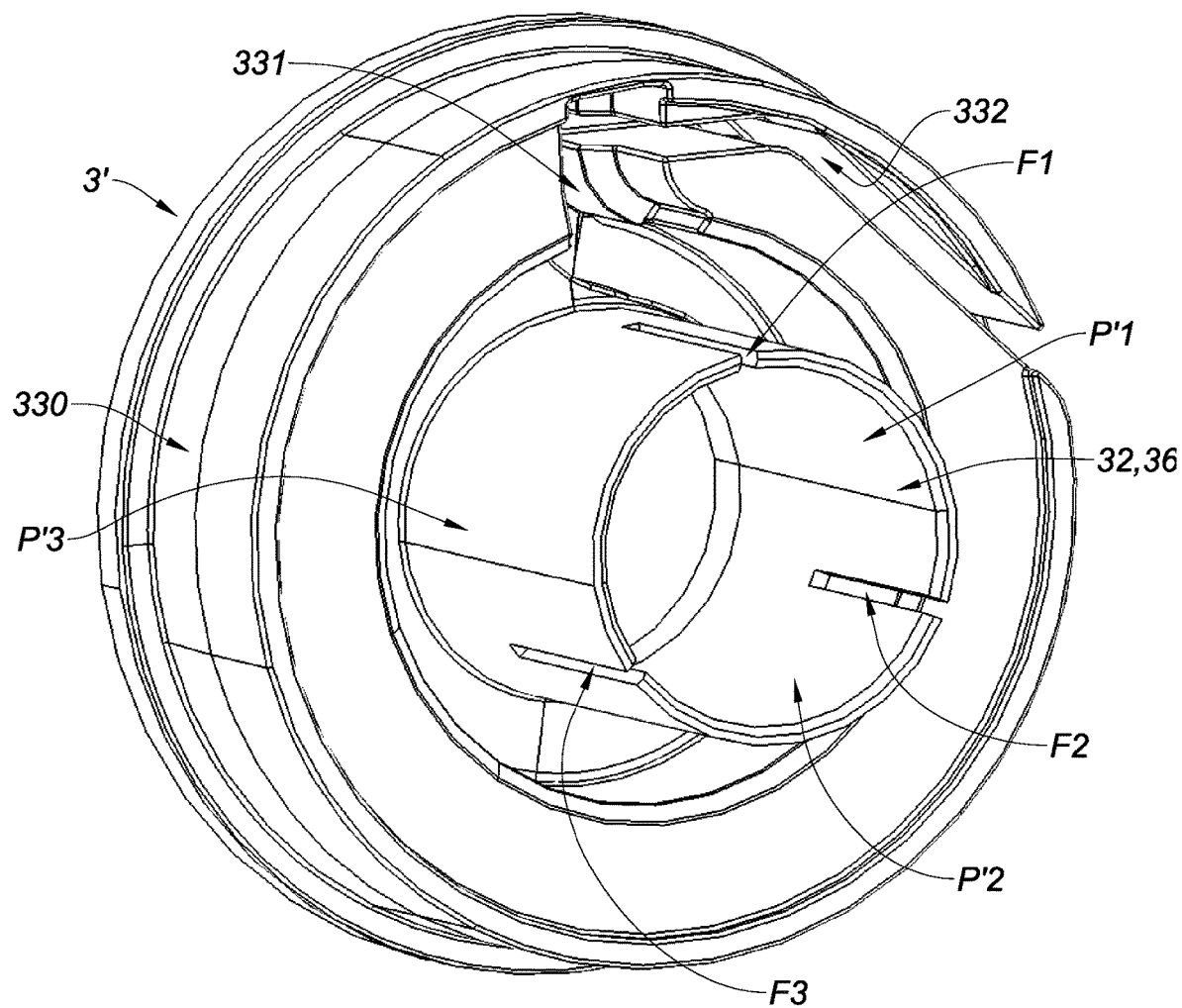

The ring gear 3' in FIG. 13 is to be compared to ring gear 3 in FIG. 4. The only differences between these two ring gears are, in FIG. 13, the presence of housing 332 for the arm 51 of the unidirectional clutch 5 and the absence of a cylindrical skirt 35. Indeed, since a unidirectional clutch is used, the cylindrical skirt 35 is not necessary, as will be explained later in FIG. 21.

The ring gear 30' in FIG. 14 differs from the ring gear 3' in FIG. 13 in the geometric shape of the cylindrical skirt 26. Indeed, in FIG. 13, and as in FIG. 4, the plurality of slots F1, F2, F3 have a width, measured on a circumference of said at least one cylindrical skirt 36, strictly lower than a width of at least one portion P'1, P'2, P'3 of the cylindrical skirt 36. On the contrary, in FIG. 14, the plurality of slots have a width, measured over the circumference of the cylindrical skirt 36, greater than or equal to a width of at least one portion P'1, P'2, P'3 of the cylindrical skirt 36. In this FIG. 14, the width of the slots is such that the cylindrical skirt 36 in FIG. 14 can be seen as a negative of the cylindrical skirt in FIG. 13.

It should be noted that a cylindrical skirt such as the one proposed in FIG. 14 could also be used in the pulley 100 of the first embodiment, to form either the cylindrical skirt 36, the cylindrical skirt 35, or both cylindrical skirts 35, 36.

The other components of the pulley 100' according to the second embodiment are not described in more detail, as they are identical to those of the first embodiment. This concerns in particular the cover 8 and the bearing 6 and also the fact that the or, as the case may be, each cylindrical skirt 35, 36 is located opposite the resiliently deformable element 4.

The ring gears 3', 30' are both ring gears with resilient cylindrical skirt 36.

Finally, in FIG. 15, a variant has been represented in which the ring gear 300' is a ring gear whose cylindrical skirt 36 is not resilient. This design is similar to that in FIG. 5, but with the presence of a housing 332 for the arm 51 of the unidirectional clutch 5 and the absence of a cylindrical skirt of larger diameter, i.e. cylindrical skirt 35.

It should be noted that, even if the presence of a cylindrical skirt 35 with a larger diameter is not mandatory in the pulley 100', this can be provided although it is not of direct interest in the operation of the pulley 100'. However, it allows to ensure a centering of the ring gear 3 in the hub 2.

Figure 23:
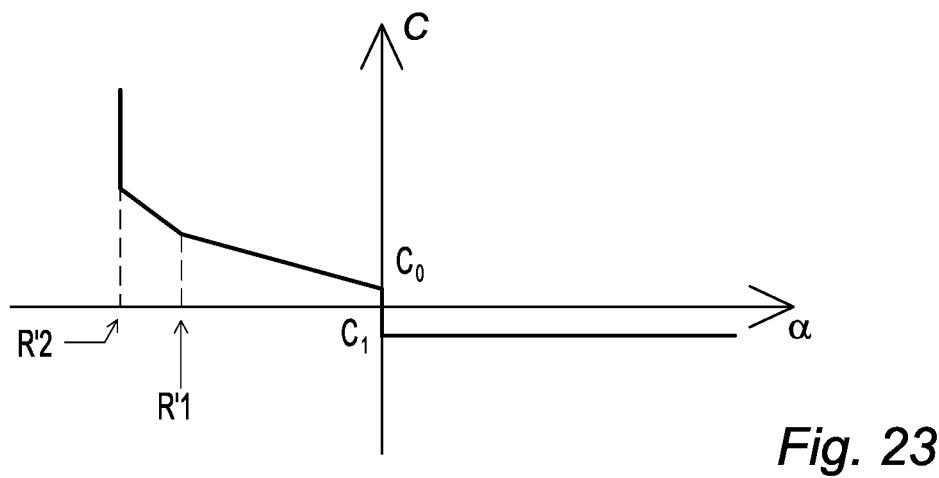
FIGS. 23 and 24 represent functional diagrams of the second embodiment of the invention, according to different variants.

FIG. 23 (case of a non-resilient cylindrical skirt 26, i.e. in particular according to FIG. 15) represents the evolution of the torque transmitted between the wheel rim 1 and the hub 2, as a function of the angle formed between the wheel rim 1 and the hub 2. The origin on the angle (zero angle) corresponds to a limit position between a stress on the resiliently deformable element 4 and an absence of stress on the same element 4.

We still consider the case where the wheel rim 1 is driving and the hub 2 is being driven. When the wheel rim is rotated (clockwise by convention, linked for example to acceleration), the unidirectional clutch 5 is stressed and then allows the ring gear 300' to be driven by wheel rim 1 and then by the hub 2 via the resiliently deformable element 4. The torque transmitted to the means then increases. This corresponds, in FIG. 23, to the negative angles between the zero angle and the angle R'1.

At angle R'1, the resiliently deformable element 4 is contacting with the cylindrical skirt 36.

Beyond the angle R'1, an additional torque is added as a result of this contact until the angle R'2 is reached for which the resiliently deformable element 4 can no longer be deformed.

If the wheel rim 1 decelerates, the curve in FIG. 23 is traversed from angle R'2 to zero angle, from which the unidirectional clutch 5 is no longer activated.

If the deceleration is sufficiently high, FIG. 23 is shown in the positive angle range where the torque is constant. Indeed, in this area, the unidirectional clutch is no longer stressed and there is therefore a relative movement between the ring gear 300' and the wheel rim 1 (freewheel mode). As explained above, this constant torque includes a bearing/hub friction component and a component connected to the friction between the cover 8 and the ring gear, the total providing a torque $C_1$.

Figure 24:
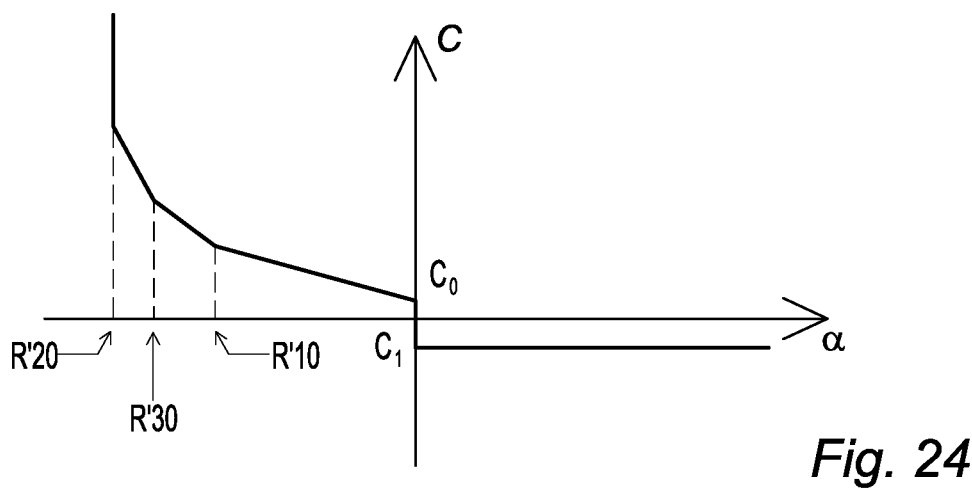

FIG. 24 (case of a resilient cylindrical skirt 26, i.e. in particular according to FIG. 13 or FIG. 14) represents the evolution of the torque transmitted between the wheel rim 1 and the hub 2, as a function of the angle formed between the wheel rim 1 and the hub 2. Once again, the origin on the angle (zero angle) corresponds to a limit position between a stress on the resiliently deformable element 4 and an absence of stress on the same element 4.

If we compare FIG. 24 to FIG. 22, we see that:
the angle R'10 corresponds to the angle R'1;
the angle R'20 corresponds to the angle R'2, insofar as it is a position in which the resiliently deformable element can no longer be deformed.

On the other hand, FIG. 24 shows the presence of an angle R'30 corresponding to the contacting of the resiliently deformable element 4 with the cylindrical skirt 36. Between the angles R'30 and R'20, this corresponds to the operation associated with the resilient deformation of the cylindrical skirt 36 up to the angle R'20 which corresponds to the contacting of the cylindrical skirt 36 with the hub 2, in this case with the wall P1 of the hub 2.

In the operation described above, the case has been described where the resiliently deformable element operates in closing mode to ensure the passage of torque between the wheel rim 1 and the hub 2.

Of course, the operation would be similar if the resiliently deformable element 4, worked in opening, with a cylindrical skirt of larger diameter, i.e. a cylindrical skirt 35 (cf. FIG. 16).

Figure 19:
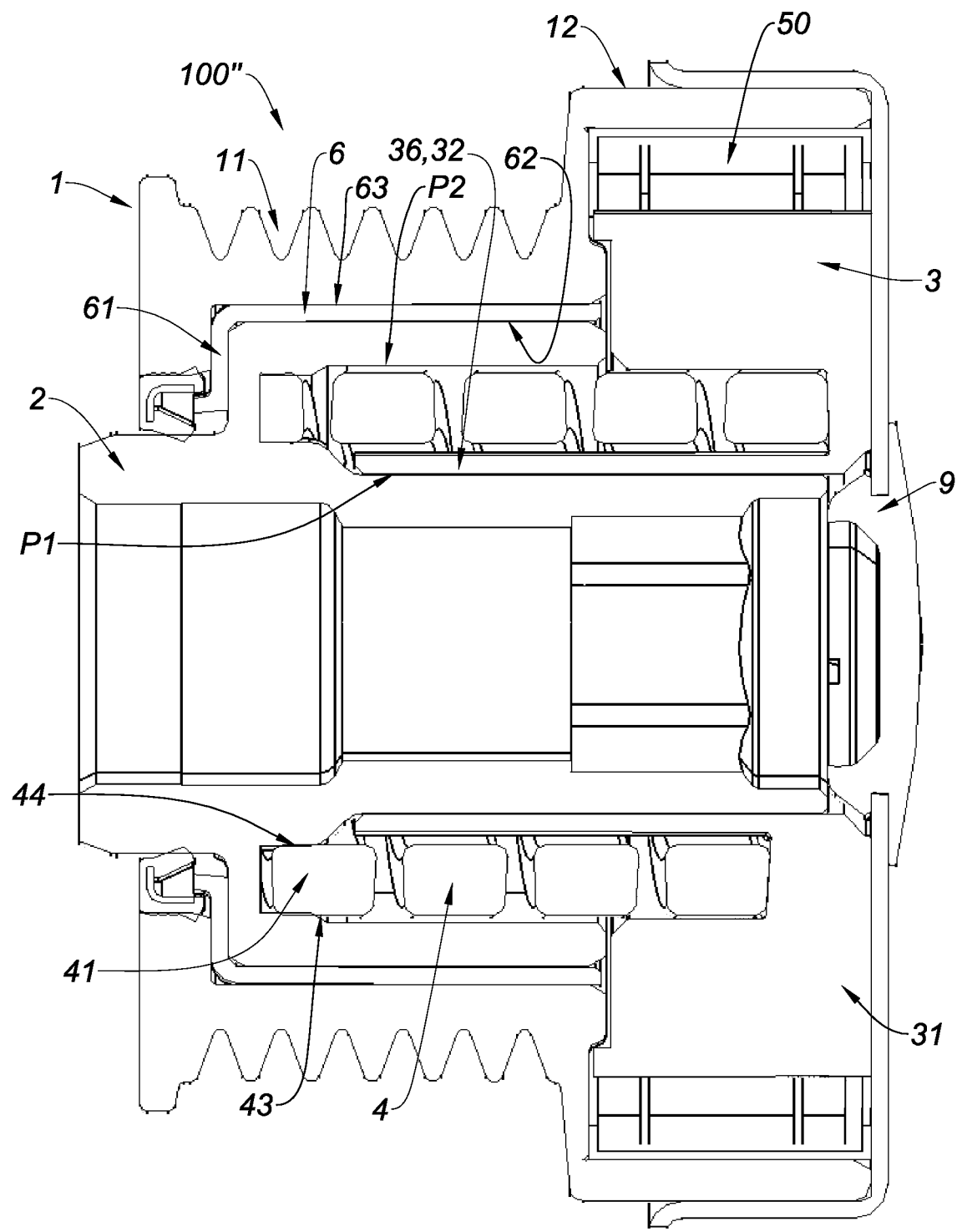
FIGS. 19 and 20 represent a third embodiment of an uncoupling pulley in accordance with the invention.
Figure 20:
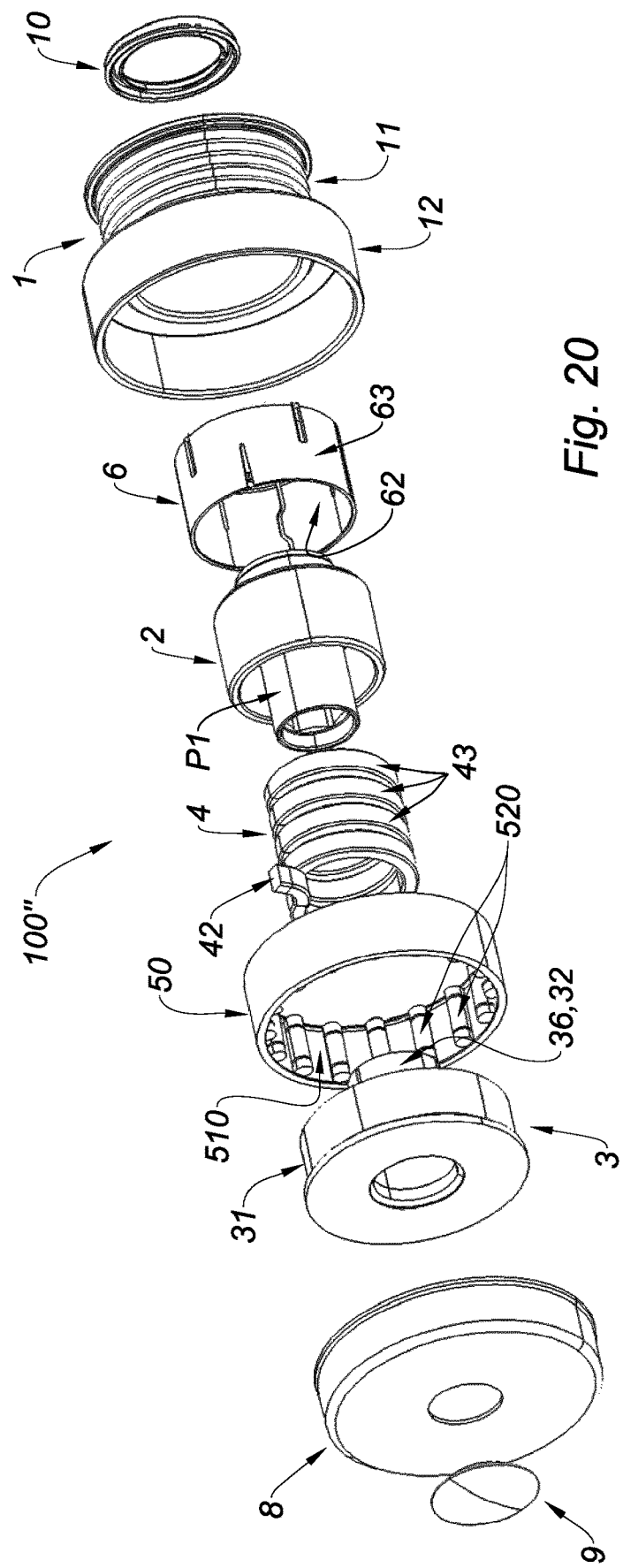

A third embodiment of the invention is described in support of FIGS. 19 and 20.

Compared to the first embodiment, the modification concerns the way in which the drive is carried out between the wheel rim 1 and the ring gear 3. Thus, in this third embodiment, the pulley 100'' is such that the wheel rim 1 does not have inner stops and the ring gear 3', 30', 300' does not have outer stops.

For this pulley 100', the drive between the wheel rim 1 and the ring gear is carried out by a unidirectional freewheel 50.

Compared to the second embodiment, the unidirectional freewheel 50 replaces the unidirectional clutch 5 to ensure the drive of the ring gear 3 by the wheel rim 1.

More precisely, the unidirectional freewheel 50 is mounted forcefully in the second area 12 of the wheel rim 1, against the inner periphery 110 of the wheel rim 1 and on the other hand around the first portion 31 of ring gear 3. The inner wall 510 of the unidirectional freewheel 50 includes rollers 520 which allow, in a first relative rotation direction between the wheel rim 1 and the ring gear 3, to ensure the drive of the ring gear 3 by the wheel rim 1 (coupling mode) and in a second relative rotation direction between the wheel rim 1 and the hub 2, opposite to the first relative rotation direction, to leave the ring gear 3 free with respect to the wheel rim 1 (freewheeling mode). Here again, the first portion 31 of the ring gear is more rigid than the second portion 32 of this ring gear.

The result is therefore the same as that described for the unidirectional clutch of the pulley 100' of the second embodiment.

Also, the operating curves in FIGS. 23 and 24 are transposable here in the case of the pulley 100' equipped with an unidirectional freewheel 50.

Finally, it should be noted that if the lifetime of the pulley is to be improved, it is preferable to use a resiliently deformable element 4 working in closing (fatigue) in the coupling mode. On the other hand, this is more complicated to manufacture.

Also, the selection can be made to use a resiliently deformable element 4 working in opening in the coupling mode. Although less effective in terms of fatigue, it is also less expensive.

Whatever the choice made on this working method, the fact remains that the invention proposed here improves, in both cases, the lifetime of the pulley.

Finally, whatever the embodiment considered, the ring gear may be made, for example, of a material selected from the following materials:

- plastics such as polyamide (PA), polyester, polyoxymethylene (POM), polyether ether ketone (PEEK), polyphenylene sulphide (PPS) or alloys thereof (said plastic materials may or may not be loaded);
- thermoplastic elastomers (TPE);
- metals such as aluminium, bronze, brass, steel and their alloys.

The invention claimed is:

1. An uncoupling pulley provided with a longitudinal axis, said pulley including:
    a wheel rim comprising a first area, intended for receiving a belt connecting the wheel rim to a first power-transmission element, and a second area located in an axial extension, in the direction defined by the longitudinal axis of the pulley, of the first area;
    a hub rigidly connected to a second power-transmission element;
    one of the power-transmission elements being driving and the other being driven;
    a ring gear including a first portion located under the second area of the wheel rim and a second portion presented in the shape of at least one resilient cylindrical skirt extending, from the first portion, along said longitudinal axis, said at least one cylindrical skirt of the ring gear including a plurality of longitudinal slots and consequently a plurality of portions separated from each other by one of the slots, said ring gear being capable of rotating relative to the wheel rim and the hub about said longitudinal axis;
    means for driving the ring gear relative to the wheel rim;
    a resiliently deformable element, a first end of which is fixed to the hub and a second end of which is fixed to the ring gear; and
    said at least one cylindrical skirt being moreover located opposite the resiliently deformable element, so that the resiliently deformable element can contact said at least one cylindrical skirt.

2. The pulley according to claim 1, wherein at least one slot of said plurality of slots has a width, measured on a circumference of said at least one cylindrical skirt, strictly lower than a width of at least one portion of the cylindrical skirt.

3. The pulley according to claim 1, wherein at least one slot of said plurality of slots has a width, measured on the circumference of said at least one cylindrical skirt, greater than or equal to a width of at least one portion of the cylindrical skirt.

4. The pulley according to claim 1, wherein the ring gear is made of a material selected from plastics including polyamide, polyester, polyoxymethylene, polyether ether ketone, polyphenylene sulfide or alloys thereof or thermoplastic elastomers.

5. The pulley according to claim 1, wherein the second portion of the ring gear is in the form of two concentric cylindrical skirts, the resiliently deformable element being located between the two cylindrical skirts.

6. The pulley according to claim 1, wherein means for ensuring, in a first relative rotation direction between the wheel rim and the hub, the drive of the ring gear by the wheel rim include:
    at least one stop located on the inner periphery of the wheel rim, at the level of the second area; and
    at least one stop located on the outer periphery of the ring gear, at the level of the first portion.

7. The pulley according to claim 6, wherein:
    the inner periphery of the wheel rim includes at least one second stop; and
    the outer periphery of the ring gear includes at least one second stop.

8. The pulley according to claim 1, wherein means for ensuring, in a first relative rotation direction between the wheel rim and the hub, the drive of the ring gear by the wheel rim include an unidirectional clutch, an end of which is fixed to the ring gear and the remaining portion of which is mounted both under the second area of the wheel rim and around the ring gear.

9. The pulley according to claim 8, wherein the unidirectional clutch is a torsion spring.

10. The pulley according to claim 1, wherein means for ensuring, in a first relative rotation direction between the wheel rim and the hub, the drive of the ring gear by the wheel rim include an unidirectional freewheel mounted on one hand, by force with the second area of the wheel rim and on the other hand, around the first portion of the ring gear.

11. The pulley according to claim 1, including at least one bearing located between the wheel rim and the hub.

12. The pulley according to claim 11, wherein said at least one bearing includes a radially extending face in contact with the hub.

13. The pulley according to claim 11, wherein said at least one bearing is made of either a plastic material selected from polyether ether ketone, polyethylene terephthalate, polyamide loaded with molybdenum disulfide, polyamide loaded with polytetrafluoroethylene or polyoxymethylene or a metallic or metallic alloy inner layer, covered by a polytetrafluoroethylene loaded outer layer.

14. The pulley according to claim 1, in which a cover is provided, fixedly mounted on the wheel rim.

15. The pulley according to claim 14, wherein the cover is in contact with the ring gear.

16. The pulley according to claim 1, in which the first portion of the ring gear is more rigid than the second portion of the ring gear.

17. The pulley according to claim 1, wherein the resiliently deformable element is a torsion spring centered on the hub.

* * * * *